(12) United States Patent
Mizuno et al.

(10) Patent No.: US 8,539,149 B2
(45) Date of Patent: *Sep. 17, 2013

(54) STORAGE SYSTEM AND COMMUNICATIONS METHOD

(75) Inventors: Makio Mizuno, Sagamihara (JP); Shuji Nakamura, Machida (JP); Masanori Takada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,739

(22) Filed: Jul. 10, 2012

(65) Prior Publication Data

US 2013/0019123 A1    Jan. 17, 2013

Related U.S. Application Data

(63) Continuation of application No. 12/324,908, filed on Nov. 28, 2008, now Pat. No. 8,219,747.

(30) Foreign Application Priority Data

Oct. 9, 2008    (JP) ................................ 2008-262684

(51) Int. Cl.
    *G06F 12/00*    (2006.01)
(52) U.S. Cl.
    USPC ........... 711/112; 711/100; 711/111; 711/113; 711/114; 369/33.01; 710/33; 714/48; 714/49; 714/50
(58) Field of Classification Search
    None
    See application file for complete search history.

(56) References Cited

U.S. PATENT DOCUMENTS

| | | | |
|---|---|---|---|
| 5,915,092 A | 6/1999 | Morita et al. | 709/213 |
| 5,938,786 A * | 8/1999 | Gregg | 714/748 |
| 6,591,351 B1 | 7/2003 | Urabe et al. | 711/162 |
| 6,859,824 B1 | 2/2005 | Yamamoto et al. | 709/217 |
| 6,975,655 B2 | 12/2005 | Fischer et al. | 370/516 |
| 7,010,607 B1 | 3/2006 | Bunton | 709/228 |
| 7,570,447 B2 | 8/2009 | Koga et al. | 360/53 |
| 7,640,395 B2 | 12/2009 | Coulson et al. | 711/113 |
| 7,849,258 B2 | 12/2010 | Sato et al. | 711/112 |

(Continued)

FOREIGN PATENT DOCUMENTS

| | | |
|---|---|---|
| JP | 61-079344 | 4/1986 |
| JP | 63-073740 | 4/1988 |

(Continued)

OTHER PUBLICATIONS

'Transmission Control Protocol DARPA Internet Program Protocol Specification' from Sep. 1981 prepared for Defense Advanced Research Projects Agency Information Processing Techniques Office by Information Sciences Institute University of Southern California.*

*Primary Examiner* — Steven Snyder
(74) *Attorney, Agent, or Firm* — Antonelli, Terry, Stout & Kraus, LLP.

(57) ABSTRACT

Storage system arrangement wherein: when a transmission destination determines that a source-side serial number included in a received packet is the same as a current destination-side serial number in the transmission destination, the transmission destination processes a content of the received packet in accordance with a command included in the received packet; and when the transmission destination determines that the source-side serial number is not the same as the current destination-side serial number, the transmission destination does not process a content of the received packet.

12 Claims, 15 Drawing Sheets

(56) References Cited

U.S. PATENT DOCUMENTS

| | | | |
|---|---|---|---|
| 2001/0034799 A1 | 10/2001 | Ito et al. | 709/250 |
| 2005/0080946 A1 | 4/2005 | Hosoya | 710/33 |
| 2005/0144173 A1 | 6/2005 | Yamamoto et al. | 1/1 |
| 2005/0182864 A1 | 8/2005 | Hosoya et al. | 710/22 |
| 2008/0270629 A1 | 10/2008 | Yang et al. | 709/248 |
| 2010/0199040 A1 | 8/2010 | Schnapp et al. | 711/114 |

FOREIGN PATENT DOCUMENTS

| | | |
|---|---|---|
| JP | 06-097921 | 4/1994 |
| JP | 11-175260 | 7/1999 |
| JP | 2005-228245 | 8/2005 |
| JP | 2007-053588 | 3/2007 |

\* cited by examiner

STORAGE SYSTEM AND COMMUNICATIONS METHOD

CROSS REFERENCE TO RELATED APPLICATION

This is a continuation of U.S. application Ser. No. 12/324,908, filed Nov. 28, 2008 now U.S. Pat. No. 8,219,747. This application relates to and claims priority from Japanese Patent Application No. 2008-262684, filed on Oct. 9, 2008. The entirety of the contents and subject matter of all of the above is incorporated herein by reference.

BACKGROUND OF THE INVENTION

1. Field of the Invention

The present invention relates to a storage system that includes a host computer, and a disk control device performing control over a disk device storing data asked for writing by the host computer, and controls a communications mode on an internal network in the disk control device.

2. Description of the Related Art

With the recent improvements of processors in terms of processing capabilities and advances of the data transmission technology, a demand has been increasing for a higher level of processing capabilities of storage systems. A previous storage system is in a mode of connection communications, i.e., mode with an internal network for connecting component sections of a disk control device in charge of controlling a disk device. An example includes JP-A-11-175260 (Patent Document 1).

With such a mode of connection communications, however, it takes time to establish and release the connection, for example, there is thus a limit in terms of increase of processing capabilities of the storage systems.

In order to meet such an increasing demand for a higher level of performance of the storage systems, a replacement of such a previous mode of connection communications is absolutely necessary. In consideration thereof, for the purpose of increasing the performance of the storage systems, Patent Document 1 describes a storage system in a mode of connectionless communications for an internal network of a disk control device.

SUMMARY OF THE INVENTION

The storage system of Patent Document 1 is both in the modes of connection communications and connectionless communications for the internal network of the disk control device.

The problem with the storage system of Patent Document 1 is that, when any of the component sections in the disk control device is in communications with the mode of connectionless communications, the reliability is reduced. A more specific description is as below.

That is, with the mode of connection communications, a transmission source establishes in advance a connection with a transmission destination before transmitting data. Such a process of establishing and releasing the connection, for example, will reduce the performance of the storage system.

Exemplified here is a case of using the mode of connection communications for transmitting a plurality of data groups varying in type and properties. When the transmission source transmits second data of a small amount after transmitting first data of a large amount, the transmission source transmits the first data after establishing a connection with the transmission destination for transmission of the first data, and after completion of transmission of the first data, starts transmission of the second data.

In this case, the process of transmitting the second data is put on hold by the time taken to complete the transmission of the first data. This resultantly increases the response time, thereby reducing the performance of the storage system.

This is because, while the connection is being established between the transmission source and the transmission destination, the transmission destination of the connection is not allowed for communications with any other transmission sources until the connection with the current transmission source is released. As such, the transmission source can perform data transmission with reliability to the connection destination connected thereto.

As such, the mode of connection communications indeed reduces the processing capabilities of the storage system, but can increase the reliability.

On the other hand, with the mode of connectionless communications, data transmission is performed without establishing a connection. The storage system can be thus increased in performance, but the reliability is reduced.

Another problem with the mode of connectionless communications is that, when a transmission destination is provided with a communications request coming from a plurality of transmission sources all at once, the transmission destination has to communicate with that many transmission sources asking for communications.

As such, with the mode of connectionless communications, the communications requests may be directed to a transmission destination that is not the original destination in the case when any access conflict is occurring on a communications path between the transmission sources and the transmission destination, when a switch on the communications path is erroneously set, or when the hardware is broken.

For preventing such erroneous transmission, the following communications method is a possibility, i.e., the transmission source(s) receive a response first from the transmission destination, and then perform data transmission while checking the sequence of data by the response, or the transmission destination forward a response to the transmission source (s) when storing data, and the transmission source(s) check whether the data is correctly stored or not. With such a communications method, however, until the transmission source(s) receive the response from the transmission destination, the process is put on hold, thereby reducing the performance of the storage system.

In consideration thereof, an object of the invention is to provide a storage system that offers a guarantee of reliability with the improved performance thereof.

A typical example of the invention is as below. That is, a storage system is provided with a host computer, and a disk control device connected to the host computer for communications therewith, and performs control over a disk device that stores therein data requested for writing from the host computer. In such a storage system, the disk control device includes a host interface section connected to the host computer, a disk interface section connected to the disk device, a memory section that includes a memory area for temporary storage of data for communications with the host computer, and a memory section including an area for storage of control data of the storage system, and a processor section that includes a processor in charge of computing processing, and an area for storage of a program to be run by the processor. In the storage system, for data transmission from the host interface section or the disk interface section to the memory section, when the data requested by a transmission source for storage is stored in a transmission destination, the transmission destination is put in a first mode for communications of forwarding a response back to the transmission destination.

According to an embodiment of the invention, a storage system can offer a guarantee of reliability with the improved processing capabilities thereof.

DESCRIPTION OF THE PREFERRED EMBODIMENTS

In the below, a storage system of embodiments of the invention is described by referring to FIGS. 1 to 15.

First Embodiment

A storage system of a first embodiment of the invention is described by referring to FIGS. 1 to 12.

Figure 1:
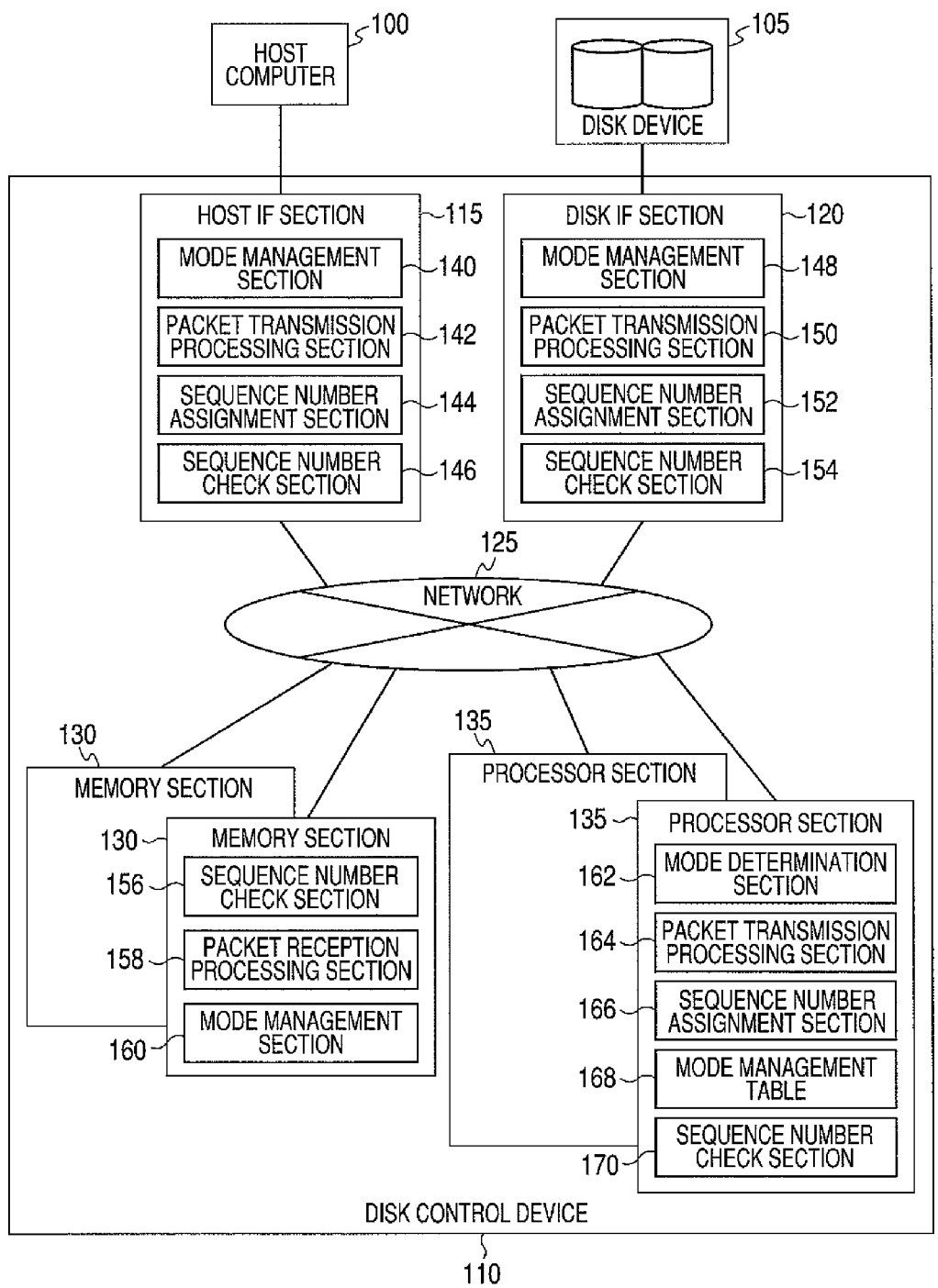
FIG. 1 is a block diagram showing the configuration of a storage system in a first embodiment of the invention.

FIG. 1 is a block diagram showing the configuration of the storage system of the first embodiment of the invention.

The storage system is configured to include a host computer 100, a disk control device 110 connected to the host computer 100, and a disk device 105 connected to the disk control device 110.

Generally, in an SAN (Storage Area Network), the host computer 100 and the disk control device 110 are connected to each other by a Fibre Channel, Ethernet™, or others over a network configured by a switch or others (not shown).

The host computer 100 forwards a request for data writing or reading to the disk control device 110.

When a write request comes from the host computer 100, the disk control device 110 writes data requested for writing into the disk device 105 after storing the data into a memory section 130.

On the other hand, when a read request comes from the host computer 100, the disk control device 110 reads data requested for data reading from the disk device 105, and forwards the data to the host computer 100 after storing the data into the memory section 130.

The disk control device 110 is configured to include a host IF (Interface) section 115, a disk IF (Interface) section 120, a network section 125, the memory section 130, and a processor section 135.

The host IF section 115 is provided with an interface to be connected to the host computer 100. The host IF section 115 executes a protocol process to packets provided by the host computer 100. To be specific, by executing the protocol process, the host IF section 115 makes various specifications, and converts the packets into a format of data for storage in the disk device 105. The various specifications include the storage location of the packets in the disk device 105, the capacity of the packets, and the type of command included in the packets.

For data transmission from the disk control device 110 to the host computer 100, the host IF section 115 determines whether the data is located in the memory 130 or in the disk device 105. Such a determination is made based on information about the storage location found in the command provided by the host computer 100, directory information about a cache memory, and others. When the data is located in the memory section 130, in response to a command from the processor section 135, the host IF section 115 reads the data from the memory section 130 and executes the protocol process to the read data.

To be specific, based on the communications protocol between the disk control device 110 and the host computer 100, the host IF section 115 makes a data addition to the read data, thereby generating a packet for transmission to the host computer 100. The data to be added includes identification data of the host computer 100 being a transmission destination, control data related to the command to the host computer 100 being a transmission destination, and others.

When the data is located in the disk device 105, in response to a command from the processor section 135, the disk IF section 120 reads the data from the disk device 105, and stores the data into the memory section 130 at a predetermined area therein. The following process when the data is located in the disk device 105 is the same as the process to be executed when the data is in the memory section 130.

The disk IF section 120 is provided with an interface to be connected to the disk device 105. The disk IF section 120 has the functions same as those of the host IF section 115. As a specific example, the disk IF section 120 executes the protocol process to the packets provided by the disk device 105. The disk IF section 120 also converts the packets into a format for storage in the disk device 105.

The network section 125 establishes a connection among the component sections in the disk control device 110, i.e., the host IF section 115, the disk IF section 120, the memory section 130, and the processor section 135, thereby relaying communications thereamong.

The memory section 130 is configured to include a cache memory area, and a system area. The cache memory area is provided for temporary storage of data to be communicated with the host computer 100, and the system area is for storage of various data of the storage system, i.e., control data, configuration data, directory data, and others.

The processor section 135 controls the component elements in the disk control device 110, i.e., the host IF section 115, the disk IF section 120, and others. For example, the control includes a parameter setting to the host IF section 115 and the disk IF section 120. The processor section 135 also performs failure monitoring of the storage system, and when detecting any failure, accordingly executes a process of handling the failure.

Described now are the details of the host IF section 115.

The host IF section 115 is configured to include a mode management section 140, a packet transmission processing section 142, a sequence number assignment section 144, a sequence number check section 146, a data transfer control section (not shown), and a buffer memory (not shown).

When the host IF section 115 performs data transmission, the mode management section 140 manages a communication mode which is used for the data transmission. Herein, the communications mode is described in detail by referring to FIGS. 2 to 5. The packet transmission processing section 142 transmits packets in a communications mode under the management of the mode management section 140.

The sequence number assignment section 144 assigns a sequence number to each of the packets provided by the packet transmission processing section 142. The sequence number check section 146 determines whether or not the sequence number assigned to the packet provided to the host IF section 115 is the same as that under the management of the host IF section 115.

The data transfer control section transfers data requested by the host computer 100 for writing to the memory section 130, or reads data requested by the host computer 100 for reading from the memory section 130. The buffer memory temporarily stores the packets received by the host IF section 115.

Described next are the details of the disk IF section 120.

The disk IF section 120 is configured to include a mode management section 148, a packet transmission processing section 150, a sequence number assignment section 152, a sequence number check section 154, a data transfer control section (not shown), and a buffer memory (not shown). Herein, the component sections in the disk IF section 120, i.e., the mode management section 148, the packet transmission processing section 150, the sequence number assignment section 152, the sequence number check section 154, the data transfer control section, and the buffer memory, are the same as the component sections in the host IF section 115, i.e., the mode management section 140, the packet transmission processing section 142, the sequence number assignment section 144, the sequence number check section 146, the data transfer control section, and the buffer memory, and thus are not described twice.

Described next is the memory section 130.

The memory section 130 is configured to include a sequence number check section 156, a packet reception processing section 158, and a mode management section 160, and component sections not shown, i.e., a data transfer control section, a memory module, and a memory controller.

The sequence number check section 156 determines whether or not the sequence number assigned to the packet provided by the processor section 135 is the same as that under the management of the memory section 130.

The packet reception processing section 158 executes a protocol process to the packets provided by the host IF section 115, the disk IF section 120, and the processor section 135. The mode management section 160 is the same as the component sections in the host IF section 115, i.e., the mode management section 140 and the disk IF section 120, and thus is not described again.

The memory module is provided with a memory area for storage of data coming from the host computer 100. The memory controller controls inputs and outputs to/from the memory module.

Note here that the memory section 130 is not necessarily provided with the sequence number assignment section. This is because the packets coming from the memory section 130 being a transmission source are only response packets with respect to any request coming from the host IF section 115, the disk IF section 120, and the processor section 135. When receiving the response packets, these component sections, i.e., the host IF section 115, the disk IF section 120, and the processor section 135, can each specify to which request the response packets are corresponding. As such, even if the response packets coming from the memory section 130 are changed in sequence, this causes no problem so that the memory section 130 is not necessarily provided with the sequence number assignment section.

Described next are the details of the processor section 135.

The processor section 135 is configured to include a mode determination section 162, a packet transmission processing section 164, a sequence number assignment section 166, a mode management table 168, a sequence number check section 170, a processor (not shown), and an internal memory (not shown).

The component sections, i.e., the packet transmission processing section 164, the sequence number assignment section 166, and the sequence number check section 170, are the same as the component sections in the host IF section 115, i.e., the packet transmission processing section 142, the sequence number assignment section 144, and the sequence number check section 146, and thus are not described twice.

The mode determination section 162 executes a mode determination process of determining a communications mode for each of the component sections in the disk control device 110. Note here that the mode determination process will be described in detail later by referring to FIG. 7.

The mode management table 168 is used for the mode determination section 162 to determine the communications mode. Note here that the mode management table 168 will be described in detail later by referring to FIGS. 6A and 6B.

The processor executes various types of programs, and controls the component sections of the disk control device 110. The internal memory stores various programs and data, i.e., a control program for controlling the component sections of the disk control device 110, a program for executing the mode determination process, control data needed to execute the control program, and directory data of the memory section 130.

Described next is the communications mode by referring to FIGS. 2 to 5.

Figure 2:
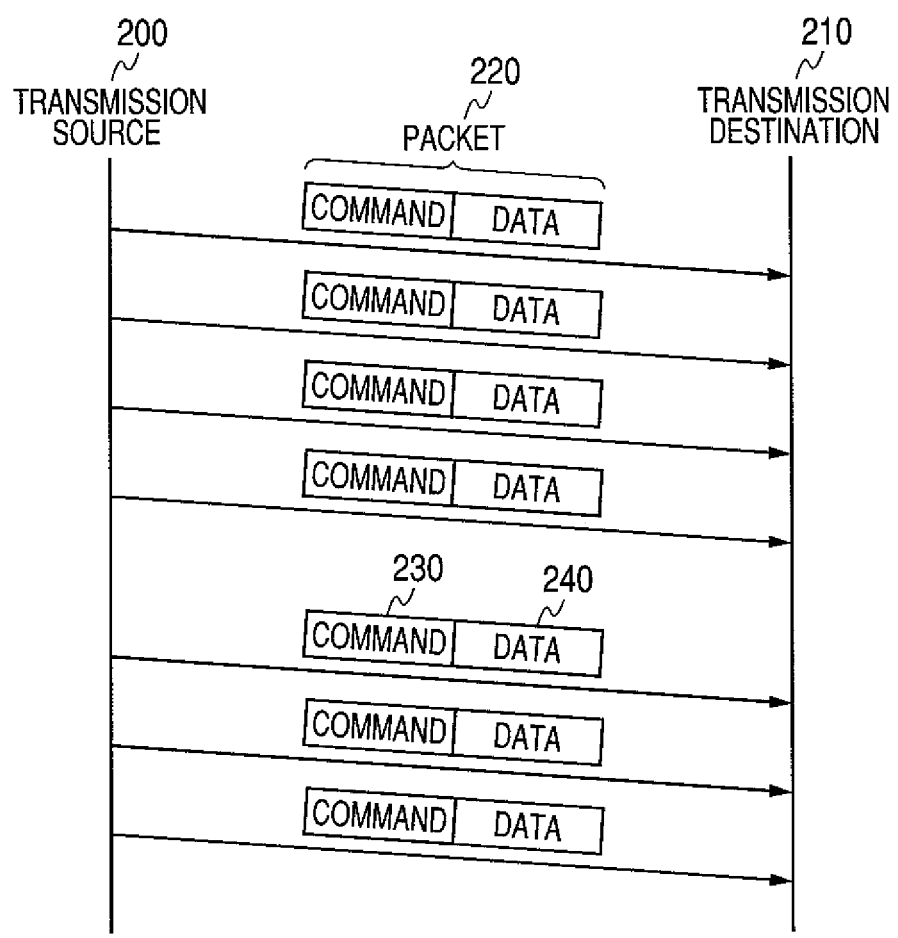
FIG. 2 is a sequence diagram of communications in a no-response access mode in the first embodiment of the invention.

FIG. 2 is a sequence diagram of communications in a no-response access mode, i.e., first mode, in the first embodiment of the invention.

In the no-response access mode, a transmission source 200 forwards a request to a transmission destination 210, but the transmission destination 210 does not respond back to the transmission source 200 after processing the request.

To be specific, the transmission source 200 transmits, to the transmission destination 210, a packet 220 including a command 230, i.e., request, and data 240. When receiving the packet 220, the transmission destination 210 analyzes the packet 220, thereby specifying the type of request requested by the command 230. The transmission destination 210 then executes the process corresponding to the specified request, and receives a packet subsequent to the packet 220 provided by the transmission source 200. The transmission destination 210 then analyzes thus provided packet 220.

In the no-response access mode, the transmission source 200 is allowed to transmit the next packet 220 without waiting the response indicating the completion of process execution corresponding to the request by the transmission destination 210. The response time can be thus much shorter than any other communications modes.

The problem is that, however, when the transmission destination 210 cannot execute the process corresponding to the request, i.e., due to some failure, the transmission source 200 cannot immediately detect the failure.

Even if the transmission source 200 detects the failure not soon enough, however, the processor or others in the transmission source 200 may troubleshoot.

Such a no-response access mode is used for an initial setting to the host IF section 115 or the disk IF section 120, for example.

Figure 3:
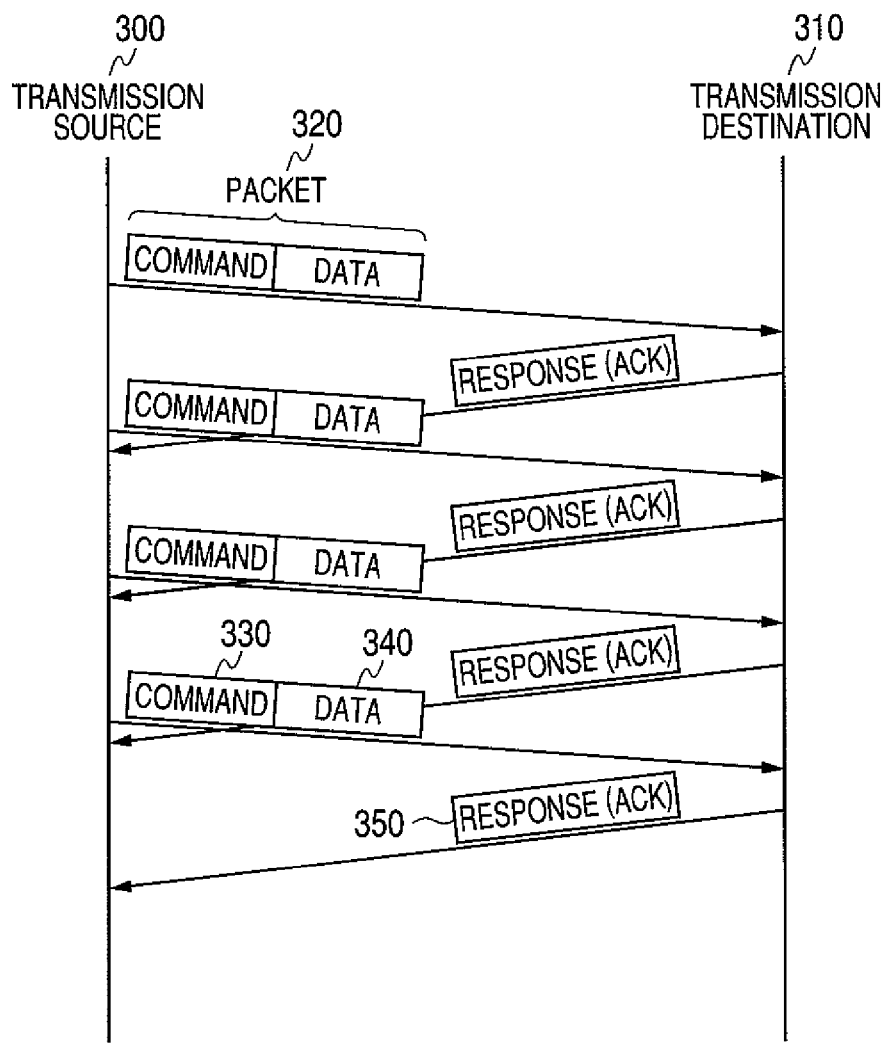
FIG. 3 is a sequence diagram of communications in a response access mode in the first embodiment of the invention.

FIG. 3 is a sequence diagram of communications in a response access mode, i.e., second mode, in the first embodiment of the invention.

In the response access mode, a transmission source 300 forwards a request to a transmission destination 310, and after processing the request, the transmission destination 310 forwards a response back to the transmission source 300.

To be specific, the transmission source 300 transmits, to the transmission destination 310, a packet 320 including a command 330, i.e., request, and data 340. When receiving the packet 320, the transmission destination 310 analyzes the packet 320, thereby specifying the type of request asked by the command 330. The transmission destination 310 then executes the process corresponding to the specified request, and when the process for the specified request is completed, returns a response packet 350 to the transmission source 300.

In the response access mode, the transmission source 300 uses the response packet 350 coming from the transmission destination 310 to determine whether the transmission destination 310 completes normally the process corresponding to the request or not. After receiving the response packet 350, when the contents of the incoming response packet 350 indicate normal, the transmission source 300 determines that the transmission destination 310 completes normally the process for the request. On the other hand, when the contents of the incoming response packet 350 indicate abnormal, or when the response packet 350 does not come, the transmission source 300 determines that some abnormal event has occurred to the transmission destination 310 during execution of the process for the request.

As such, the response access mode is preferably used for communications expected to be high in reliability. For example, the response access mode is used for communications between the host IF section 115 and the memory section 130 when the data provided by the host computer 100 is stored in the memory area of the memory section 130.

The host computer 100 performs data transmission to the disk control device 110 basically only once. As such, if some abnormal event occurs while the disk control device 110 is being in a process of storing the data provided by the host computer 100 into the memory section 130, and if the data is lost, the disk control device 110 may not be recovered from the failure. The host IF section 115 thus has to perform data transmission while checking whether or not the data is stored in the memory section 130 without fail. As such, when the data provided by the host computer 100 is stored in the memory area of the memory section 130, if the response access mode is used for communications between the host IF section 115 and the memory section 130, through reception of the response packet 350 from the memory section 130, the host IF section 115 can perform data transmission while checking storage of data in the memory section 130.

Figure 4:
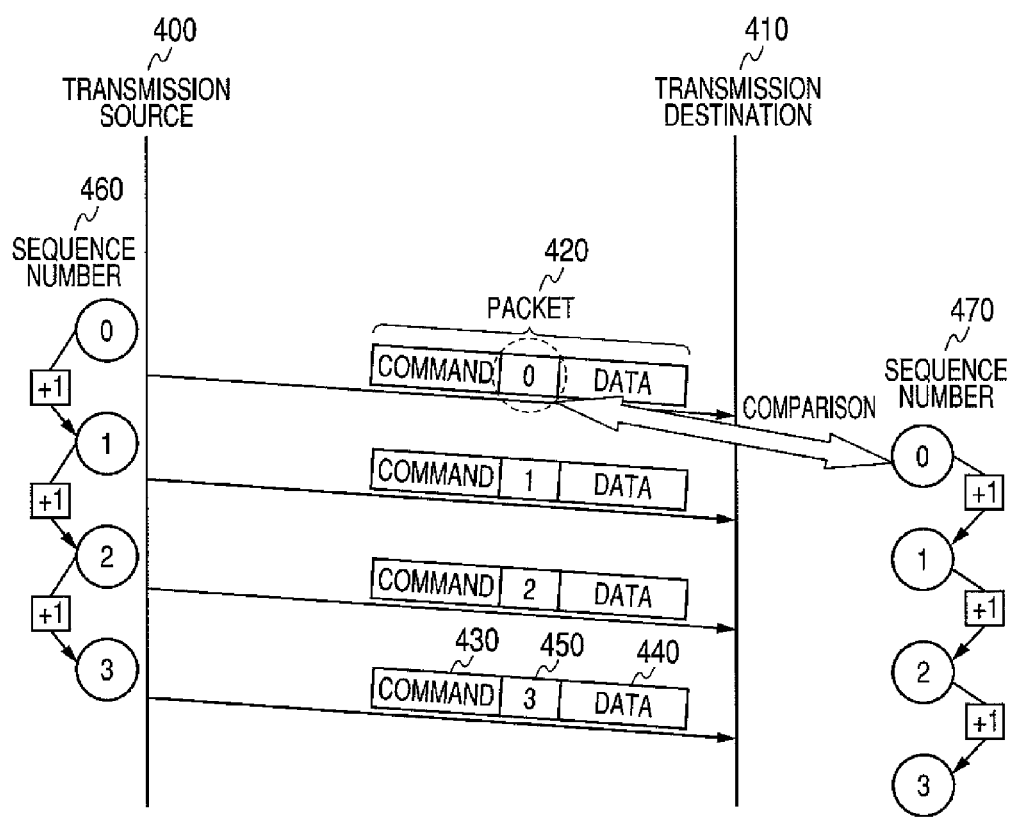
FIG. 4 is a sequence diagram of communications in a sequence-number-assigned access mode in the first embodiment of the invention.

FIG. 4 is a sequence diagram of communications in a sequence-number-assigned access mode, i.e., third mode, in the first embodiment of the invention.

In the sequence-number-assigned access mode, a sequence number 450 being a serial number is assigned to a packet 420 when a transmission source 400 transmits the packet 420 to a transmission destination 410.

In the transmission source 400, the sequence number 450 to be assigned to the packet 420 is set to "0" in the initial state. The transmission destination 410 manages a sequence number 470 for comparison with the sequence number 450 assigned to the packet 420. The sequence number 470 is also set to "0" in the initial state.

First of all, the transmission source 400 transmits, to the transmission destination 410, the packet 420 including a command 430, data 440, and the sequence number 450. Note that the sequence number 450 in the firstly-transmitted packet 420 is "0".

When receiving the packet 420, the transmission destination 410 determines whether or not the sequence number 450 found in the packet 420 is the same as the sequence number 470 of its own management.

When the determination result is YES, i.e., the sequence number 450 in the packet 420 is determined as the same as the sequence number 470 under the management of the transmission destination 410, the transmission destination 410 analyzes the command 430 included in the packet 420, thereby executing the process corresponding to the command 430.

On the other hand, when the determination result is NO, i.e., the sequence number 450 in the packet 420 is determined as not the same as the sequence number 470 under the management of the transmission destination 410, the transmission destination 410 detects that there is any packet 420 not correctly received. Because no notification of completion of the process comes from the transmission destination 410 after the elapse of a predetermined length of time, the transmission source 400 detects that some abnormal event has occurred, i.e., mismatching of sequence numbers, in the transmission destination 410.

With the sequence-number-assigned access mode, the transmission destination 410 can detect erroneous transmission of the packet 420, i.e., the packet 420 is transmitted to any other transmission destination that is not the original transmission destination 410. Such erroneous transmission is caused due to erroneous routing in the network section 125, an erroneous setting in the network section 125, and others. The sequence-number-assigned access mode is used for communications between the host IF section 115 and the memory section 130 when the host IF section 115 writes the data provided by the host computer 100 into the memory section 130, for example.

Figure 5:
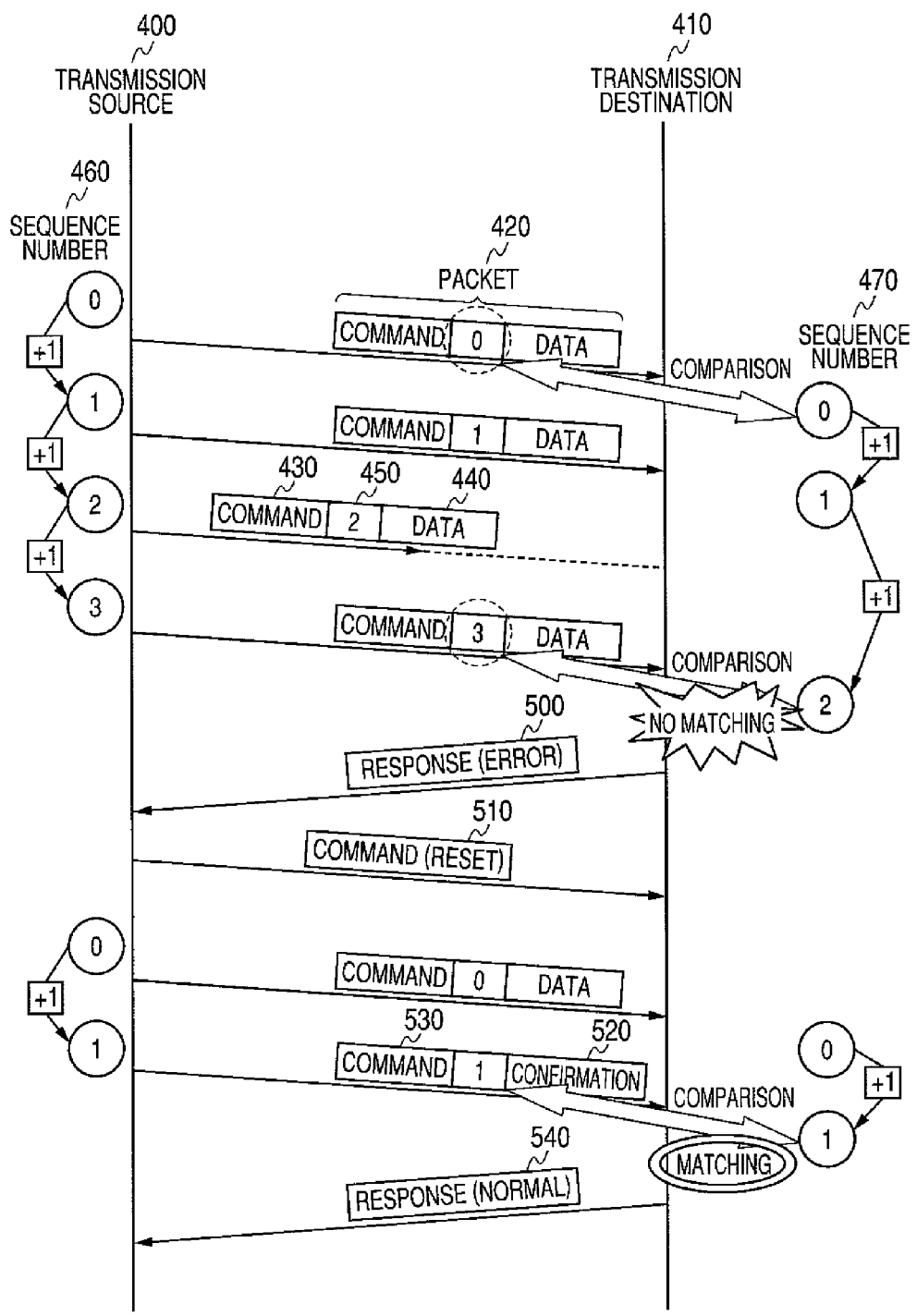
FIG. 5 is a sequence diagram of communications in a sequence-number-assigned confirmed access mode in the first embodiment of the invention.

FIG. 5 is a sequence diagram of communications in a sequence-number-assigned confirmed access mode, i.e., fourth mode, in the first embodiment of the invention. Note here that any configuration component of FIG. 5 same as that of FIG. 4 is provided with the same reference numeral, and not described again.

In the sequence-number-assigned confirmed access mode, when the sequence number in the packet 420 is not the same as that under the management of the transmission destination 410 in the sequence-number-assigned access mode of FIG. 4, the transmission destination 410 transmits a response packet 500 indicating the occurrence of some abnormal event back to the transmission source 400. Upon reception of such a response packet 500, the transmission source 400 resets a sequence number 460, and transmits a command packet 510 for reset use of the sequence number 470 under the management of the transmission destination 410.

To be specific, the transmission source 400 transmits, to the transmission destination 410, the packet 420 with the sequence number 450 of "0". Upon reception of such a packet 420, the transmission destination 410 determines whether or not the sequence number 450 in the packet 420 is the same as the sequence number 470 of its own management. In this case, the sequence number 450 in the packet 420 is "0", and the sequence number 470 of its own management is "0". As such, the sequence number 450 in the packet 420 is the same as the sequence number 470 under the management of the transmission destination 410. Accordingly, the transmission destination 410 executes the process corresponding to the request indicated by the command 430 of the packet 420, and increments the sequence number 470.

After transmitting the packet 420 with the sequence number 450 of "0", the transmission source 400 increments the sequence number 460 of its own management. Thereafter, such a process is repeated.

Assuming now is a case where the packet 420 with the sequence number 450 of "2" fails to reach the transmission destination 410 due to erroneous routing on the network section 125, or others. In such a case, the transmission destination 410 does not increment the sequence number 470.

Next, the transmission source 400 forwards the packet 420 with the sequence number 450 of "3". Upon reception of such a packet 420 with the sequence number 450 of "3", the transmission destination 410 makes a determination about a matching of the sequence numbers. Herein, the sequence number 450 in the packet 420 is "3", and the sequence number 470 under the management of the transmission destination 410 is "2". The transmission destination 410 thus determines that the sequence number 450 in the packet 420 is not the same as the sequence number 470 of its own management.

Therefore, the transmission destination 410 thus returns, to the transmission source 400, the response packet 500 indicating the occurrence of some abnormal event, i.e., mismatching of the sequence numbers.

Upon reception of the response packet 500, the transmission source 400 resets the sequence number 460 of its own management, and transmits the command packet 510 to the transmission destination 410 to reset the sequence number 470 under the management of the transmission destination 410. Herein, upon reception of such a command packet 510, the transmission destination 410 accordingly resets the sequence number 470.

At this point in time, the sequence number 460 of the transmission source 400 and the sequence number 470 of the transmission destination 410 are both reset to "0".

The transmission source 400 then transmits the packet 420 again to the transmission destination 410. The transmission destination 410 then responsively executes the process corresponding to the request of the command 430 in the packet 420.

For the purpose of explicitly checking whether the abnormality, i.e., mismatching of the sequence numbers, is now cleared or not, the transmission source 400 transmits a confirmation packet 520 to the transmission destination 410. Herein, the command 530 in the confirmation packet 520 varies depending on whether the matching of the sequence numbers is observed or not, i.e., when the sequence number 450 in the confirmation packet 520 is the same as the sequence number 470 under the management of the transmission destination 410, the command 530 includes a request for forwarding a normal response packet 540 indicating that no abnormal event is occurring, and when the sequence number 450 of the confirmation packet 520 is not the same as the sequence number 470 under the management of the transmission destination 410, the command 530 includes a request for forwarding an abnormal response packet (not shown).

Upon reception of such a confirmation packet 520, the transmission destination 410 executes the process corresponding to the request of the command 530 in the confirmation packet 520. To be specific, the transmission destination 410 determines whether or not the sequence number 450 in the confirmation packet 520 is the same as the sequence number 470 of its own management.

When the sequence number 450 in the confirmation packet 520 is the same as the sequence number 470 of its own management, the transmission destination 410 returns the normal response packet 540 to the transmission source 400. This enables the transmission source 400 to confirm that the abnormality is now cleared.

On the other hand, when the sequence number 450 in the confirmation packet 520 is not the same as the sequence number 470 of its own management, the transmission destination 410 returns an abnormal response packet to the transmission source 400. Receiving the abnormal response packet as such tells the transmission source 400 that mismatching of the sequence numbers is observed irrespective of the fact of the sequence numbers 460 and 470 having been reset. The transmission source 400 thus determines it is highly likely that some abnormal event is occurring in the transmission destination 410 itself. In this case, an operator or others may change the transmission destination 410.

Alternatively, when receiving the abnormal response packet, the transmission source 400 may reset the sequence number 460, and transmit again the command packet 510. When the abnormal response packet keeps coming even if the sequence numbers 460 and 470 are reset for a predetermined number of times, the operator may change the transmission destination 410.

The characteristics of the sequence-number-assigned confirmed access mode are described with a comparison with the sequence-number-assigned access mode. In the sequence-number-assigned access mode, even if the transmission destination 410 detects that the sequence number 450 in the packet 420 is not the same as the sequence number 470 of its own management, it takes a predetermined time for the transmission source 400 to detect the abnormality. This predetermined time is generally needed for the transmission destination to execute the process corresponding to the request of command in all of the packets.

On the other hand, in the sequence-number-assigned confirmed access mode, when the sequence number 450 in the packet 420 is not the same as the sequence number 470 under the management of the transmission destination 410, the transmission destination 410 returns the response packet 500 to the transmission source 400, and the transmission source 400 transmits the confirmation packet 520 to the transmission destination 410 to confirm whether the sequence numbers are serving correctly or not. The transmission destination 410 thus can immediately detect any occurrence of abnormal event after a packet subsequent to the abnormal packet is transmitted. That is, in the sequence-number-assigned confirmed access mode, any abnormality of mismatching of sequence numbers can be detected sooner than in the sequence-number-assigned access mode.

Described next is the mode management table 168 by referring to FIGS. 6A and 6B.

Figure 6A:
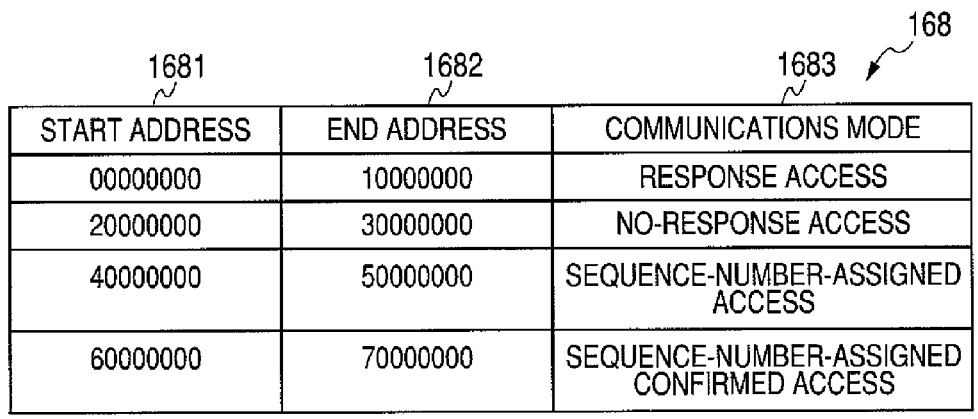
FIG. 6A is a diagram illustrating a mode management table in the first embodiment of the invention.

FIG. 6A is a diagram illustrating the mode management table 168 in the first embodiment of the invention.

The mode management table 168 includes elements of "start address 1681", "end address 1682", and "communications mode 1683".

The elements of "start address 1681" and "end address 1682" each indicate the range of transmission-destination address of each of the communications modes. The transmission-destination address is found in each packet to be transmitted from a component section of the disk control device 110 to another, and indicates the address of the component section being a transmission destination.

The element of "communications mode 1683" is recorded with various communications modes, i.e., "response access mode (refer to FIG. 2)", "no-response access mode (refer to FIG. 3)", "sequence-number-assigned access mode (refer to FIG. 4)", and "sequence-number-assigned confirmed access mode (refer to FIG. 5)".

When the transmission-destination address in the packet provided by the transmission destination is in the range of "00000000" to "10000000", the communications mode is determined to "response access mode". When the transmission-destination address in the packet provided by the transmission destination is in the range of "20000000" to "30000000", the communications mode is determined to "no-response access mode".

When the transmission-destination address in the packet provided by the transmission destination is in the range of "40000000" to "50000000", the communications mode is determined to "sequence-number-assigned access mode". When the transmission-destination address in the packet provided by the transmission destination is in the range of "60000000" to "70000000", the communications mode is determined to "sequence-number-assigned confirmed access mode".

Figure 6B:
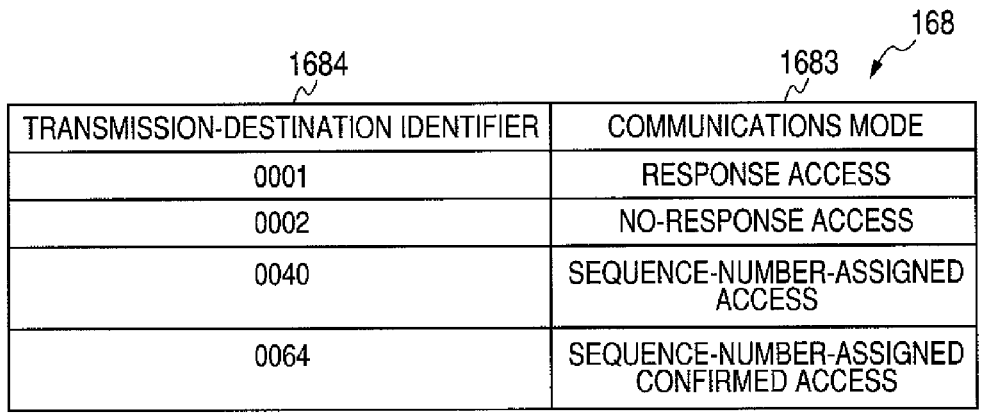
FIG. 6B is a diagram illustrating a modified example of the mode management table in the first embodiment of the invention.

FIG. 6B is a diagram illustrating a modified example of the mode management table 168 in the first embodiment of the invention.

In FIG. 6A, the transmission-destination address is used as a factor for determining the communications mode. In the modified example of the mode management table 168 of FIG. 6B, an identifier of the transmission destination is used as a factor for determining the communications mode.

The element of "transmission-destination identifier 1684" is included in a packed provided by the transmission destination and recorded with identifiers uniquely assigned respectively to component sections of the disk control device 110 whichever serving as a transmission destination.

The element of "communications mode 1683" is the same as the element of "communications mode 1683" of FIG. 6A, and thus is not described twice.

When the packet coming from the transmission destination has a transmission-destination identifier of "0001", the communications mode is determined to "response access mode". When the packet coming from the transmission destination has a transmission-destination identifier of "0002", the communications mode is determined to "no-response access mode".

When the packet coming from the transmission destination has a transmission-destination identifier of "0040", the communications mode is determined to "sequence-number-assigned access mode". When the packet coming from the transmission destination has a transmission-destination identifier of "0064", the communications mode is determined to "sequence-number-assigned confirmed access mode".

Note here that the communications mode is not restrictively determined by a transmission-destination address or a transmission-destination identifier as such, but may be determined by any other type of data as long as the transmission destination can be specified thereby.

Described next is the communications mode determination process by referring to FIG. 7.

Figure 7:
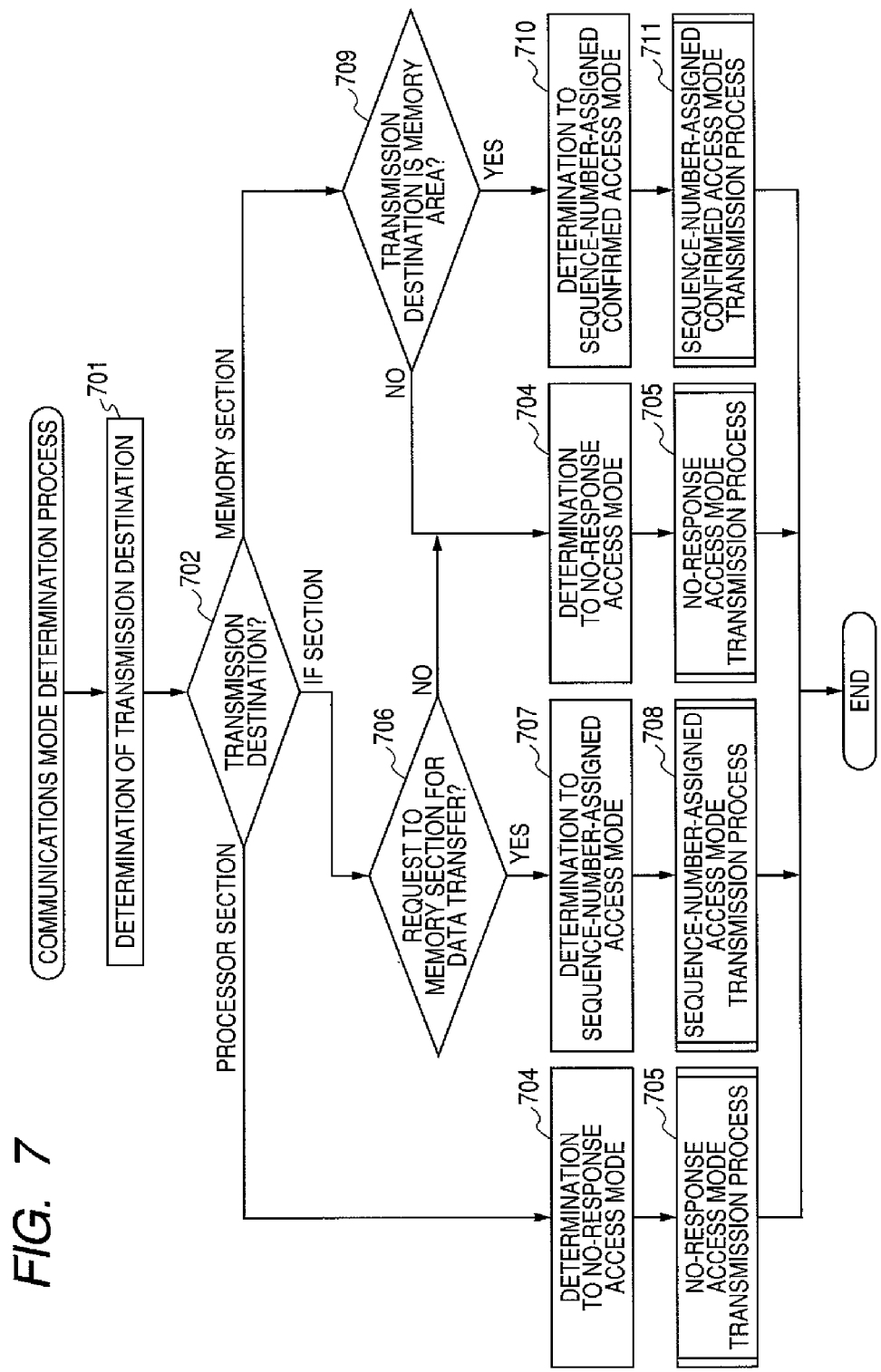
FIG. 7 is a flowchart of a communications mode determination process in the first embodiment of the invention.

FIG. 7 is a flowchart of the communications mode determination process in the first embodiment of the invention.

The communications mode determination process is executed by the processor section 135 when the processor section 135 is provided with an inquiry about which communications mode is to be used for packet transmission before transmission of a packet by the component section being a transmission source to the component section being a transmission destination.

First of all, the processor section 135 specifies the transmission destination for packet transmission (701). To be specific, the inquiry from the transmission source includes data specifying the transmission destination, i.e., transmission-destination address or transmission-destination identifier, and based on such data found in the inquiry for specifying the transmission destination, the processor section 135 specifies the transmission destination. When the specification of transmission destination is completed, the processor section 135 refers to the mode management table 168 to determine the communications mode.

The processor section 135 then determines which of the component sections, i.e., the processor section 135, the host IF section 115, the disk IF section 120, and the memory section 130, is the transmission destination specified by the process of step 701 (702). Hereinafter, the host IF section 115 or the disk IF section 120 whichever applicable is referred to as "IF section".

When the process of step 702 determines that the processor section 135 is the transmission destination specified by the process of step 701, the processor section 135 determines to perform communications in the no-response access mode (704). The data for transmission to the processor section 135 is communicated in the no-response access mode with an emphasis on the increase of the performance of the storage system than on the reliability for data storage in the transmission destination. This is because any other processor section(s) 135 not serving as a transmission destination are storing the same data as that for transmission to the processor section 135, and thus even if data transmission to the processor section 135 being a transmission destination results in a failure, the possibility of data recovery is high.

The processor section 135 then executes the no-response access mode transmission process (705). To be specific, the processor section 135 directs the component section being a transmission source having transmitted the inquiry to perform communications with the transmission destination in the no-response access mode, and then makes the component section being a transmission source to transmit a packet to the transmission destination.

Note here that for notification of a command from the host computer 100 or the disk device 105 to the processor section 135, the communications is performed in the sequence-number-assigned access mode with the transmission source being the host IF section 115 or the disk IF section 120, and with the transmission destination being the processor section 135. When the processor section 135 is a transmission destination, an initial setting to the host IF section 115 and the disk IF section 120 is so made as to perform communications in the sequence-number-assigned access mode.

On the other hand, when the process of step 702 determines that the host IF section 115 or the disk IF section 120 is the transmission destination specified by the process of step 701, a determination is then made whether the packet for transmission to the said IF section includes a command of asking to transfer the data to the memory section 130 or not (706). This determination is made to determine whether the packet for transmission to the IF section includes a command asking for initial setting thereof or not.

The request for data transfer to the memory section 130 includes a request for writing, from the host IF section 115 to the memory section 130, the data provided by the host computer 100 to the disk control device 110, a request for transmitting the data stored in the memory section 130 to the disk IF section 120, and writing the data stored in the memory section 130 into the disk device 105, a request for starting reading of the data stored in the disk device 105 from the disk IF section 120 to the memory section 130, and a request for transmitting the data stored in the memory section 130 to the host IF section 115, and reading the data stored in the memory section 130 to the host computer 100. That is, the request for data transfer to the memory section 130 is for transmitting the data of the host computer 100 or the disk device 105 to the memory section 130, or for transmitting the data stored in the memory section 130 to the host computer 100 or the disk device 105.

When the packet for transmission to the IF section includes a command asking for data transfer to the memory section 130, the packet is determined as not including a command asking to initially set the IF section. That is, in this case, the packet is determined as including a write request from the host computer 100 or a read request from the host computer 100.

On the other hand, when the packet for transmission to the IF section does not include a command asking for data transfer to the memory section 130, the packet is determined as including a command asking to initially set the IF section.

When the process of step 706 determines that the packet for transmission to the IF section includes a command asking to initially set the IF section, the processor section 135 determines the communications mode to the IF section to the no-response access mode with an emphasis on the increase of the performance of the storage system than on the reliability for data storage in the transmission destination (704). This is because the data for initial setting is stored in the processor section 135, even if data transmission to the IF section results in a failure, the data recovery is possible.

Next, the processor section 135 makes the component section being a transmission source to transmit a packet in the no-response access mode to the IF section being a transmission destination (705).

On the other hand, when the process of step 706 determines that the packet for transmission to the IF section does not include a command asking to initially set the IF section, the processor section 135 determines the communications mode to the sequence-number-assigned access mode (707), executes the sequence-number-assigned access mode transmission process (708), and then ends the communications mode determination process. Note that the sequence-number-assigned access mode transmission process will be described in detail later by referring to FIG. 8.

On the other hand, when the process of step 702 determines that the memory section 130 is the transmission destination specified in the process of step 701, the processor section 135 determines whether a packet for transmission to the memory section 130 is directed to the memory area of the memory section 130 or not (709). Such a determination is made to determine whether the packet for transmission to the memory section 130 includes a command asking to initially set the memory section 130 or not (709).

When the process of step 709 determines that the packet for transmission to the memory section 130 is not directed to the memory area of the memory section 130, the procedure goes to the process of step 704 to determine the communications mode to the no-response access mode. This is because the packet directed to the memory section 130 is for initial setting of the memory section 130.

On the other hand, when the process of step 709 determines that the packet for transmission to the memory section 130 is specifically directed to the memory area thereof, it means that the packet for transmission to the memory section 130 is not for initial setting thereof, and thus the communications mode is determined to the sequence-number-assigned confirmed access mode (710).

The processor section 135 then executes the sequence-number-assigned confirmed access mode transmission process (711), and then ends the communications mode determination process. Note that the sequence-number-assigned confirmed access mode transmission process will be described in detail later by referring to FIG. 9.

Described now are the reasons for determining the communications mode to the sequence-number-assigned access mode, and the reasons for determining the communications mode to the sequence-number-assigned confirmed access mode.

The communications mode is determined to the sequence-number-assigned access mode in the following two cases. That is, in the first case, the transmission source is the IF section and the transmission destination is the processor section 135, and when the data transfer is requested to the memory section 130. In the second case, the transmission destination is the IF section, and when the data transfer is requested to the memory section 130.

To be specific, the first case includes when a notification is provided to the processor section 135 for starting data writing from the host IF section 115 to the memory section 130, when a notification is provided to the processor section 135 to tell that the transfer of the data stored in the memory section 130 to the host IF section 115 is completed, and when a notification is provided to tell that the writing of the data stored in the memory section 130 to the disk device 105 is completed, for example.

To be specific, the second case includes when a notification is provided to the host IF section 115 to tell that the data writing from the host IF section 115 to the memory section 130 is ready to start, when a command is issued to the disk device 105 for starting writing of the data stored in the memory section 130 to the disk device 105.

That is, the sequence-number-assigned access mode is used for communications between the IF section and the processor section 135 for writing, to the memory section 130, the data provided by the host computer 100, or for reading, to the host computer 100, the data stored in the disk device 105.

During such communications, once any abnormal event occurs, i.e., a transmission destination (the IF section or the processor section 135) cannot receive a packet, the process in the transmission destination is not executed any more. Therefore, even if the transmission source transmits another packet without noticing the occurrence of abnormal event, no abnormal event occurs during the process in the transmission destination. In consideration thereof, communications is performed in the sequence-number-assigned access mode, which is slower than the sequence-number-assigned confirmed access mode in terms of timing for the transmission source to detect any abnormality.

On the other hand, when the communications mode is determined to the sequence-number-assigned confirmed access mode, it means that the transmission destination is the memory area of the memory section 130. More specifically, it means that the processor section 135 starts reading or writing of data, e.g., control data stored in the memory area of the memory section 130.

In this case, if such an abnormal event as the memory section 130 being a transmission destination not receiving a packet, the process remains to be executed in the memory section 130 being a transmission destination. As such, if the transmission source continuously performs packet transmission without noticing the abnormality occurring in the transmission destination, it may cause also abnormality to the process in the transmission destination.

Accordingly, the transmission source is required to detect any abnormality of no packet reception occurred in the transmission destination as soon as possible, and is expected to transmit again the packet(s) after the packet not received the transmission destination. In consideration thereof, for this communications, used is the sequence-number-assigned confirmed access mode faster than the sequence-number-assigned access mode in terms of timing for the transmission source to detect any abnormality.

Described next is the sequence-number-assigned access mode transmission process by referring to FIG. 8.

Figure 8:
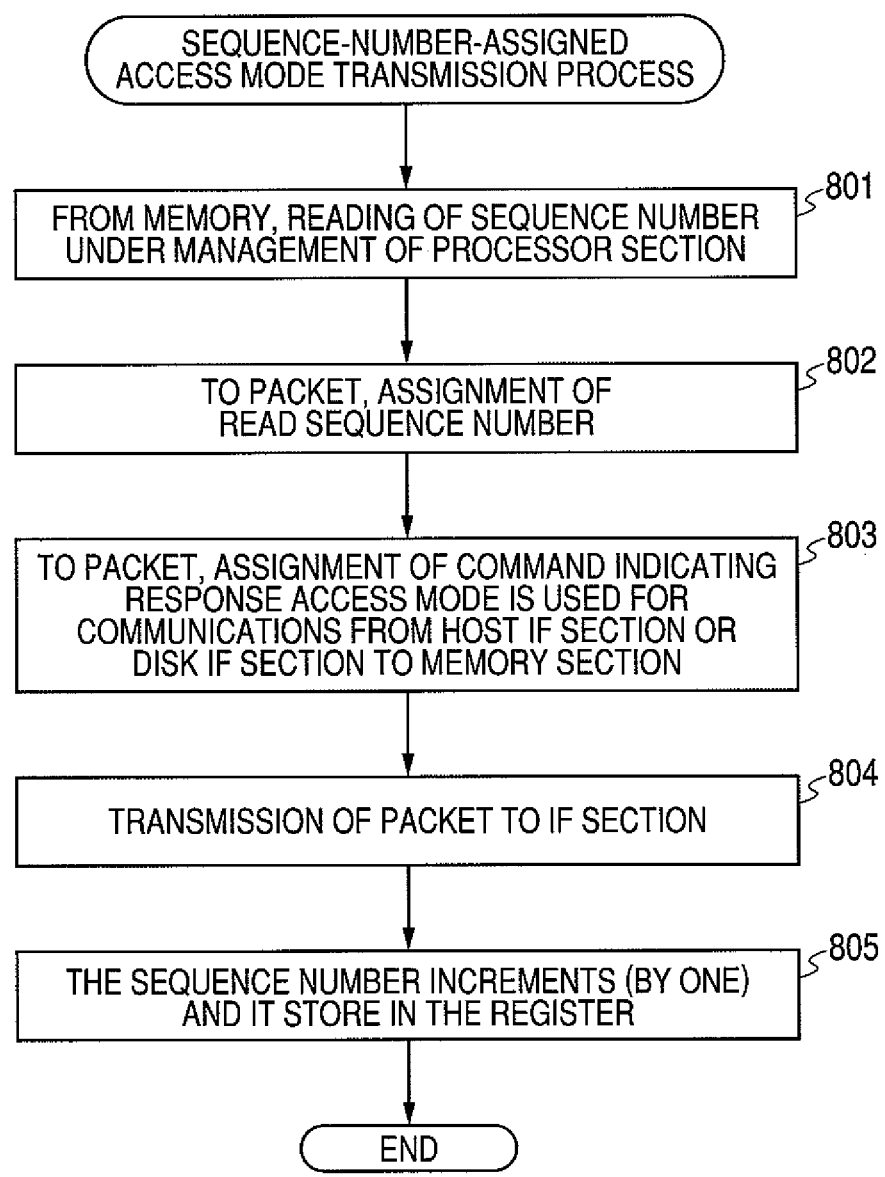
FIG. 8 is a flowchart of a sequence-number-assigned access-mode transmission process in the first embodiment of the invention.

FIG. 8 is a flowchart of the sequence-number-assigned access mode transmission process in the first embodiment of the invention.

The sequence-number-assigned access mode transmission process is executed when, in the process of step 707 of FIG. 7, the mode determination section 162 of the processor section 135 determines the communications mode to the sequence-number-assigned access mode for communications between the packet transmission source and destination.

First of all, the processor section 135 reads any of the sequence numbers of its own management (801).

The processor section 135 then adds, to a packet for transmission, the sequence number read in the process of step 801 (802).

When the memory section 130 receives a packet from the host IF section 115 or the disk IF section 120, the processor section 135 then adds, to the packet, a command to be directed to the transmission destination having received a response packet after execution of the process in the memory section 130 corresponding to a command request included in the packet (803). That is, the processor section 135 determines the communications mode to the response access mode for communications between the memory section 130, and the host IF section 115 or the disk IF section 120 being a transmission source for the next packet.

The processor section 135 then transmits the packet to the IF section being a transmission destination (804). The processor section 135 then increments the sequence number of its own management. The processor section 135 then stores the incremented sequence number into the register thereof (805), and ends the sequence-number-assigned access mode transmission process.

Figure 9:
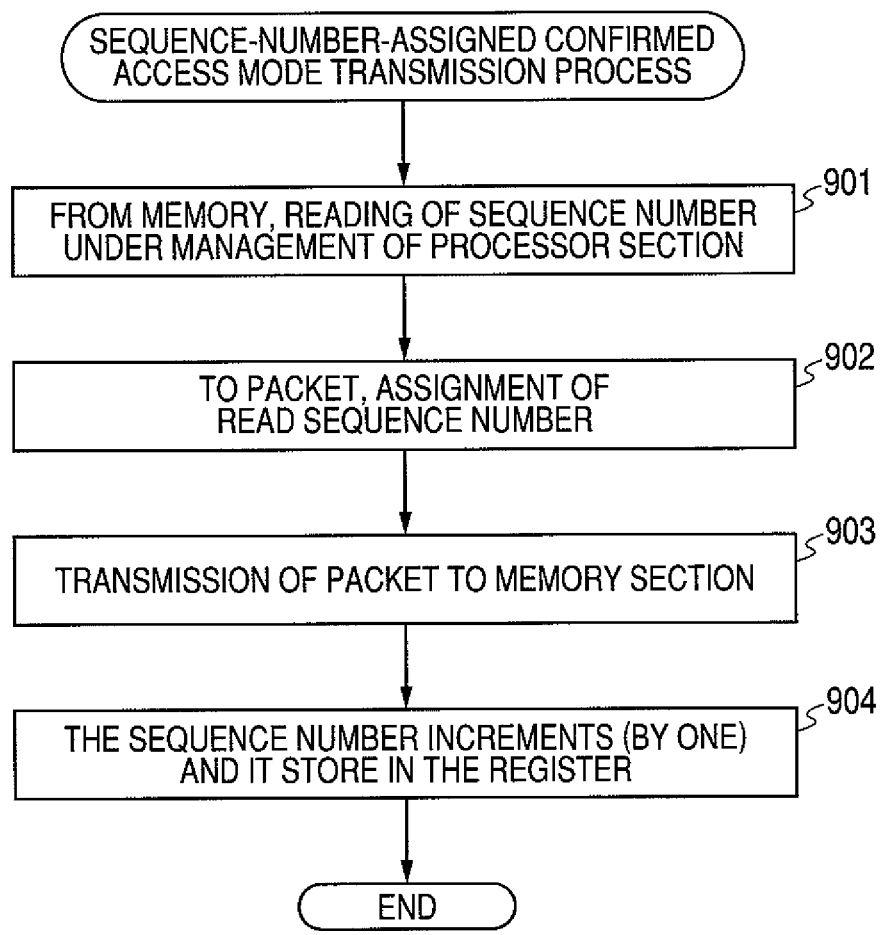
FIG. 9 is a flowchart of a sequence-number-assigned confirmed access mode transmission process in the first embodiment of the invention.

Described next is the sequence-number-assigned confirmed access mode transmission process by referring to FIG. 9. FIG. 9 is a flowchart of the sequence-number-assigned confirmed access mode transmission process in the first embodiment of the invention.

The sequence-number-assigned confirmed access mode transmission process is executed when, in the process of step 710 of FIG. 7, the mode determination section 162 of the processor section 135 determines the communications mode to the sequence-number-assigned confirmed access mode for communications between the packet transmission source and destination.

First of all, the processor section 135 reads any of the sequence numbers of its own management (901).

The processor section 135 then adds, to a packet for transmission, the sequence number read in the process of step 801 (902).

The processor section 135 then transmits the packet to the IF section being a transmission destination (903). The processor section 135 then increments the sequence number of its own management, stores the incremented sequence number into the register thereof (904), and ends the sequence-number-assigned confirmed access mode transmission process.

Described next is a packet reception process by the packet reception processing section 158 of the memory section 130 by referring to FIG. 10.

Figure 10:
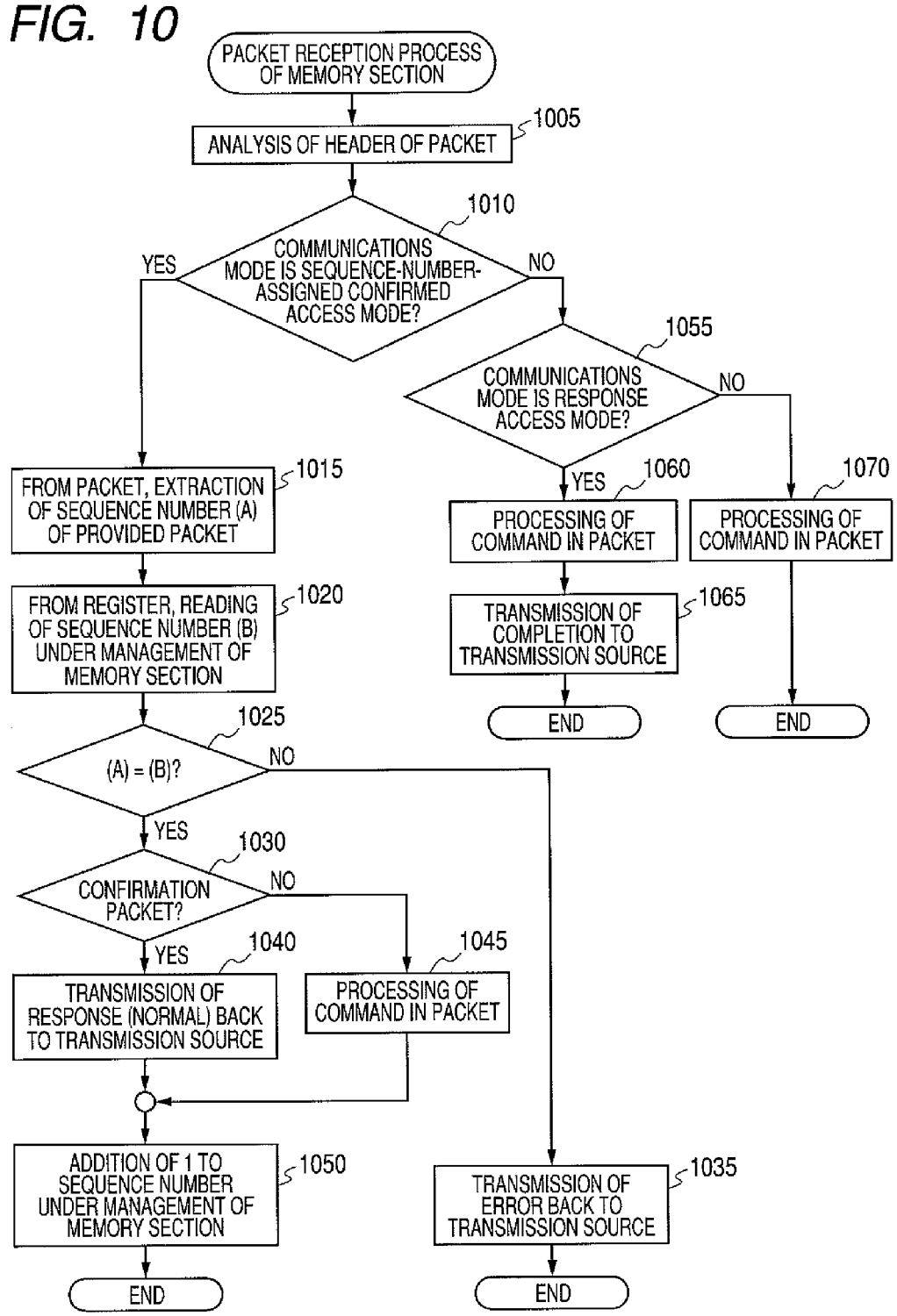
FIG. 10 is a flowchart of a packet reception process in the first embodiment of the invention.

FIG. 10 is a flowchart of the packet reception process in the first embodiment of the invention.

First of all, upon reception of a packet, the memory section 130 analyzes to see which communications mode is used to transmit the packet (1005). To be specific, the memory section 130 analyzes the header of the provided packet, thereby specifying the communications mode used for transmission of the packet.

The memory section 130 then determines whether the communications mode for the packet analyzed in the process of step 1005 is the sequence-number-assigned confirmed access mode or not (1010).

When the process of step 1010 determines that the communications mode for the packet analyzed in the process of step 1005 is the sequence-number-assigned confirmed access more, the memory section 130 extracts a sequence number (A) included in the packet (1015).

The memory section 130 then reads a sequence number (B) of its own management from the register thereof (1020).

The memory section 130 then makes a comparison between the sequence number (A) extracted in the process of step 1015 and the sequence number (B) read by the process of step 1020, thereby determining whether the sequence number (A) is the same as the sequence number (B) or not (1025).

When the process of step 1025 determines that mismatching is observed between the sequence numbers (A) and (B), a response packet is returned to the transmission source for notification that some abnormal event has occurred, i.e., mismatching of the sequence numbers (1035), and this is the end of the packet reception process of the memory section.

On the other hand, when the process of step 1025 determines that the sequence numbers (A) and (B) are the same, the memory section 130 determines whether the packet provided by the transmission source is the confirmation packet or not (1030). This is for explicitly checking whether the abnormality of mismatching of sequence numbers is now cleared or not.

When the process of step 1030 determines that the provided packet is the confirmation packet, because matching of the sequence numbers is observed, the memory section 130 returns a response packet to the transmission source to notify that the abnormality is now cleared (1040).

The memory section 130 then increments the sequence number (B) of its own management (1050), and ends the packet reception process of the memory section.

On the other hand, when the process of step 1030 determines that the provided packet is not the confirmation packet, the memory section 130 executes the process corresponding to the request of the command in the received packet (1045), and the procedure goes to the process of step 1050.

On the other hand, when the process of step 1010 determines that the communications mode for the packet analyzed in the process of step 1005 is the sequence-number-assigned confirmed access mode, a determination is then made whether the communications mode for the packet analyzed in the process of step 1005 is the response access mode or not (1060).

When the process of step 1060 determines that the communications mode for the packet analyzed in the process of step 1005 is the response access mode, the memory section 130 executes the process corresponding to the request of the command in the received packet (1060). After completion of the process executed in the process of step 1060, the memory section 130 returns a response packet to the transmission source (1065), and this is the end of the packet reception process of the memory section.

On the other hand, when the process of step 1060 determines that the communications mode for the packet analyzed in the process of step 1005 is not the response access mode, because the communications mode for the provided packet is the no-response access mode, the memory section 130 executes the process corresponding to the request of the command in the provided packet (1070), and this is the end of the packet reception process of the memory section.

By referring to FIG. 11, described next is data transmission/reception among the component sections in the disk control device 110 when the disk control device 110 receives a write request from the host computer 100.

Figure 11:
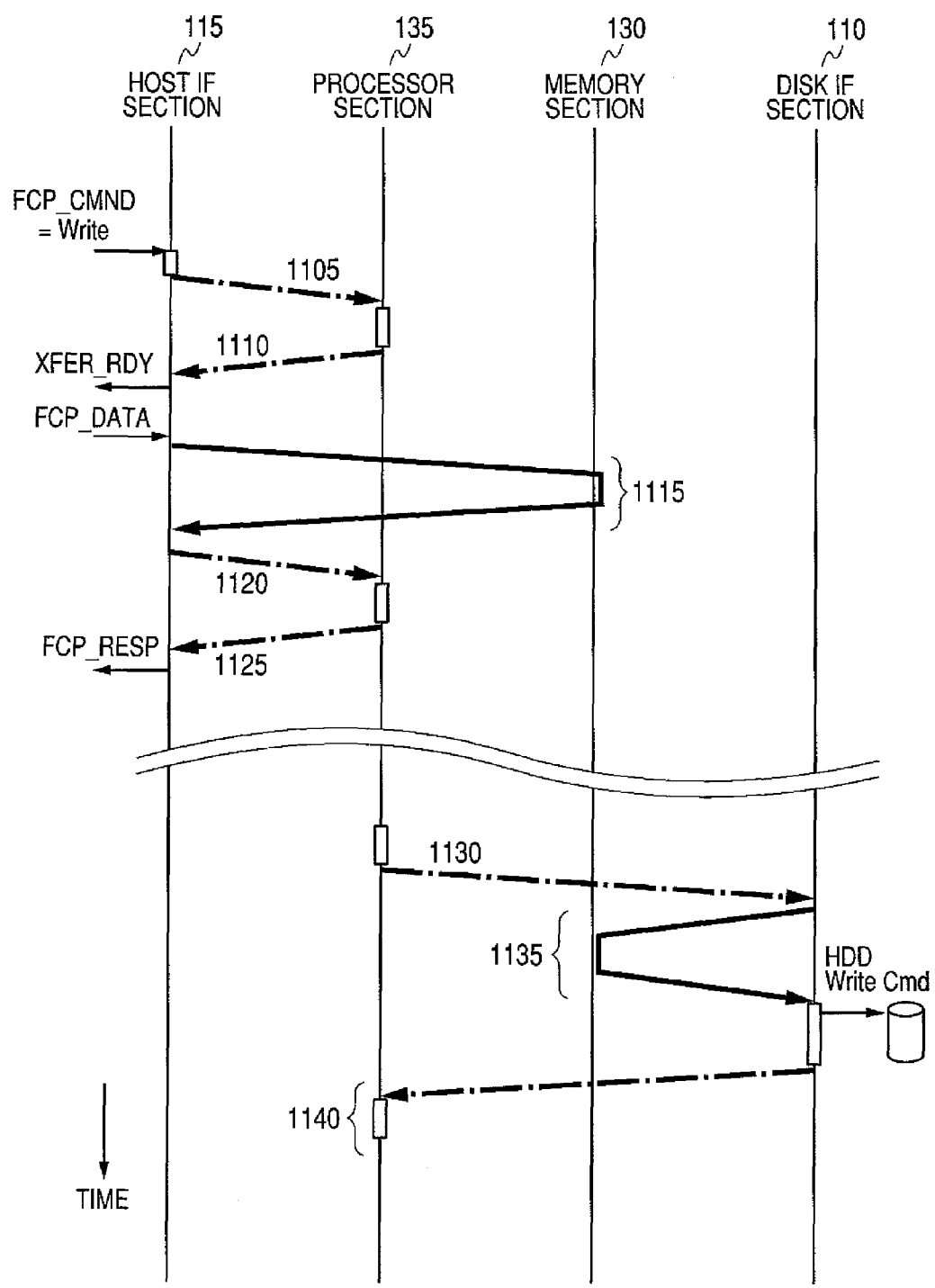
FIG. 11 is a sequence diagram of component sections in a disk control device when the disk control device receives a write request from a host computer in the first embodiment of the invention.

FIG. 11 is a sequence diagram of the component sections of the disk control device 110 when the disk control device 110 receives a write request from the host computer 100 in the first embodiment of the invention.

Note that, in FIG. 11, solid lines indicate the response mode, and the alternate long and short dashed lines indicate the sequence-number-assigned access mode.

First of all, data communications is started with a transmission source of the host IF section 115, and a transmission destination of the processor section 135 (1105).

Herein, data for transmission to the processor section 135 by the host IF section 115 is for notifying that the host IF section 115 receives a request of some kind, e.g., data write request, from the host computer 100. In FIG. 11, assumed here is that the processor section 135 receives such a data write request from the host computer 100 found in the data as a result of communications under a reference numeral 1105.

The communications of the reference numeral 1105 is performed with a transmission destination of the processor section 135, and a transmission source of the host IF section 115, and thus the communications mode therefor is determined to the sequence-number-assigned access mode by the processor section 135 in the process of step 707 of FIG. 7. Then in the process of step 708, the processor section 135 notifies, to the host IF section 115 being a transmission source, that data transmission is performed in the sequence-number-assigned access mode, and the packet transmission processing section 142 of the host IF section 115 performs packet transmission in the sequence-number-assigned access mode.

Considered here is a case where, before the host IF section 115 starts communications to make the processor section 135 to start writing of the reference numeral 1105, when the reading process is in progress in the disk control device 110, i.e., the reading process including the same access destination for the data for writing as that to the disk device 105. If this is the case, if the reading process and the writing process are executed in the reversed order, in the reading process that is already started before communications of the reference numeral 1105 is started, there may be a possibility that the data to be supposed to be read is not read but any other different data may be instead read. In consideration thereof, communications from the host IF section 115 to the processor section 135 has to be performed in the sequence-number-assigned access mode to offer a guarantee of sequence.

Thereafter, data communications is performed with a transmission source of the processor section 135, and a transmission destination of the host IF section 115 (1110).

Note here that the data to be transmitted by the processor section 135 to the host IF section 115 is for notifying the host computer 100 that the data provided thereby is ready for writing into the memory section 130.

The communications under a reference numeral 1110 is not related to a setting to enable operation of the host IF section 115 being a transmission destination, and thus the communications mode therefor is determined to the sequence-number-assigned access mode by the processor section 135 in the process of step 707 of FIG. 7. Then in the process of step 708, the packet transmission processing section 164 of the processor section 135 transmits a packet in the sequence-number-assigned access mode. Note here that the packet to be transmitted to the host IF section 115 in this process has been assigned a command in the process of step 803 of FIG. 8 for performing communications between the host IF section 115 and the memory section 130 in the response access mode.

Herein, the write data provided to the disk control device 110 by the host computer 100 for writing into the disk device 105 is not the data stored in the disk control device 110. Therefore, to offer a guarantee that the data is stored in the memory section 130 without fail, the disk control device 110 determines the communications mode to the response access mode for communications between the host IF section 115 and the memory section 130.

After transmitting the data received by the communications of the reference numeral 1110 to the host computer 100, the host IF section 115 sends, to the host IF section 115, the data for actual writing into the disk device 105, i.e., write data.

Upon reception of the write data, based on the command coming together with the packet provided by the processor section 135 by the communications of the reference numeral 1110, the host IF section 115 transmits, to the memory section 130, the write data received by the host IF section 115 in the response access mode (1115).

When the write data is stored in the memory area, the memory section 130 returns a response packet to the host IF section 115 (1115).

After completing transfer of the write data to the memory section 130, the host IF section 115 performs data communications with a transmission source of the host IF section 115, and a transmission destination of the processor section 135 (1120).

Note here that the data provided from the host IF section 115 to the processor section 135 is for notifying the processor section 135 that the writing of the write data to the memory section 130 is now completed.

The communications under a reference numeral 1120 is performed with a transmission destination of the processor section 135 and a transmission source of the host IF section 115, and thus the communications mode therefor is determined by the processor section 135 to the sequence-number-assigned access mode in the process of step 707 of FIG. 7. Then in the process of step 708, the processor section 135 notifies the host IF section 115 being a transmission source that the data transmission is performed in the sequence-number-assigned access mode, and the packet transmission processing section 142 of the host IF section 115 transmits packets in the sequence-number-assigned access mode.

In order to notify the host computer 100 that the write process of the writing data is now completed, the processor section 135 transmits the data in the sequence-number-assigned access mode with a transmission source of the processor section 135, and a transmission destination of the host IF section 115 (1125). The reasons for performing communications in the sequence-number-assigned access mode are the same as those for the communications of the reference numeral 1110.

After the write data is stored in the memory section 130, after the elapse of a predetermined time, the disk control device 110 stores, into the disk device 105, the write data stored in the memory section 130.

The data is thus communicated with a transmission source of the processor section 135, and with a transmission destination of the disk IF section 120 (1130).

Note here that the data to be transmitted by the processor section 135 to the disk IF section 120 is for requesting the disk IF section 120 to store the write data stored in the memory section 130 into the buffer memory of the disk IF section 120.

The communications under a reference numeral 1130 is not performed for an initial setting to the disk IF section 120 being a transmission destination. The communications mode therefor is thus determined to the sequence-number-assigned access mode by the processor section 135 in the process of step 707 of FIG. 7. Then in the process of step 708, the packet transmission processing section 164 of the processor section 135 transmits the packet in the sequence-number-assigned access mode. Note that the packet to be transmitted to the disk IF section 120 in this process has been added with a command in the process of step 803 of FIG. 8, i.e., a command for performing communications with the disk IF section 120 and the memory section 130 in the response access mode.

The reasons for performing communications in the response access mode between the memory section 130 and the disk IF section 120 are the same as those for performing communications under a reference numeral 1115 in the response access mode.

Upon reception of the data from the processor section 135, the disk IF section 120 returns the packet to the memory section 130 in the response communications access mode (1135). The packet is the one including the command added with the request for acquiring the write data stored in the memory section 130.

Upon reception of the packet including the command added with the request for acquiring the write data, the memory section 130 forwards, to the disk IF section 120, the write data stored in the memory area thereof. After completion of the transmission of the write data, the memory section 130 then returns a response packet to the disk IF section 120 (1135).

After acquiring the write data stored in the memory area of the memory section 130, the disk IF section 120 then returns, to the processor section 135, data for notifying the processor section 135 that the acquisition of the write data stored in the memory area of the memory section 130 is now completed (1140).

The communications of the reference numeral 1110 is not performed for an initial setting to the disk IF section 120 being a transmission destination, and thus the communications mode therefor is determined to the sequence-number-assigned access mode by the processor section 135 in the process of step 707 of FIG. 7.

Thereafter, the disk IF section 120 stores the write data acquired by the communications under a reference numeral 1135 into the disk device 105.

With such a process, the data requested for writing to the disk device 105 from the host computer 100 is stored in the disk device 105.

By referring to FIG. 12, described next is a process to be executed by a transmission source when any abnormal event of mismatching of sequence numbers is occurred in the communications in the sequence-number-assigned access mode and the communications in the sequence-number-assigned access confirmed access mode, i.e., sequence number mismatching process.

Figure 12:
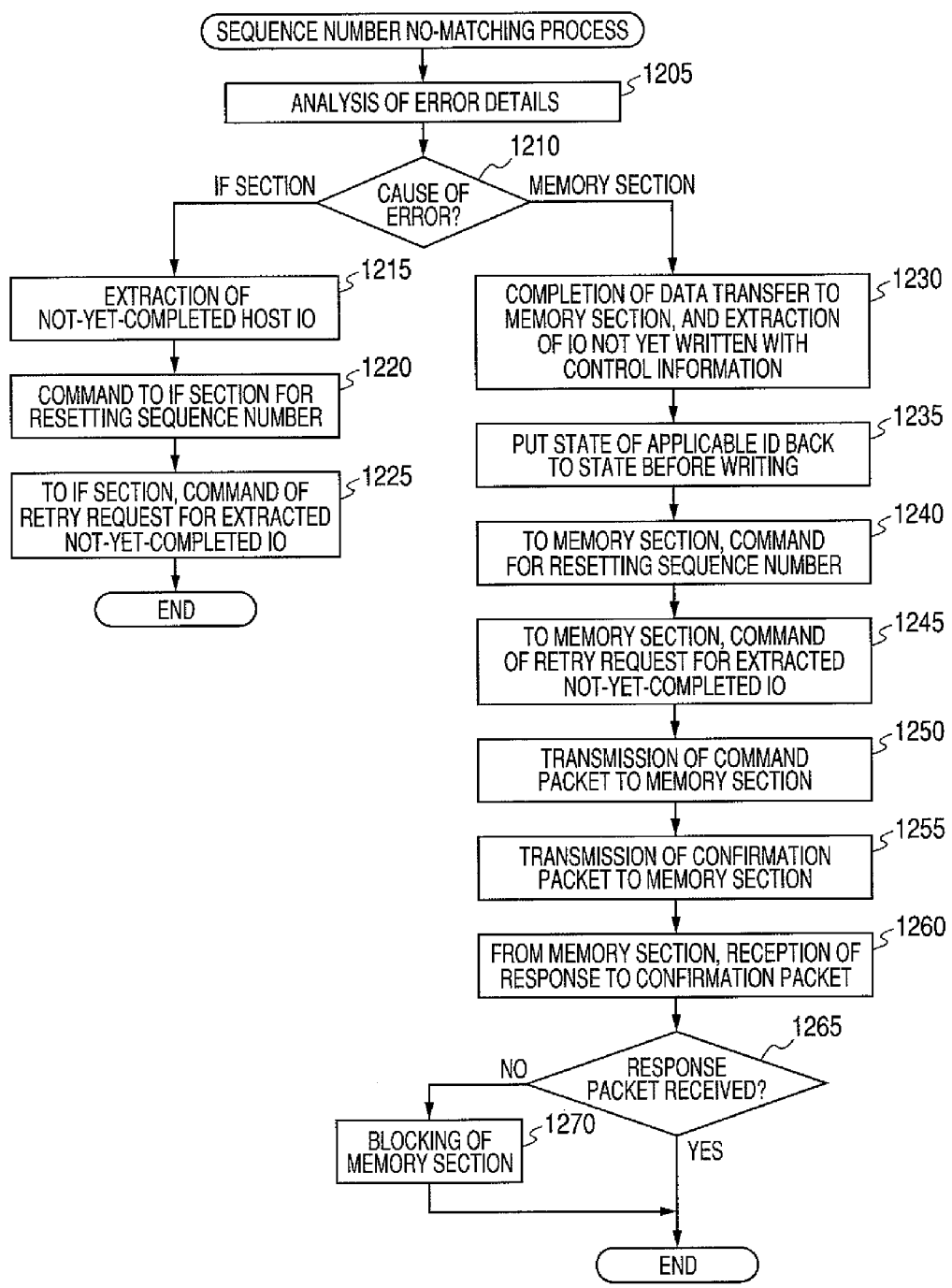
FIG. 12 is a flowchart of a sequence number mismatching process in the first embodiment of the invention.

FIG. 12 is a flowchart of the sequence number mismatching process in the first embodiment of the invention.

First of all, a transmission source detects any abnormality that a sequence number in the transmitting packet is not the same as a sequence number under the management of a transmission destination, and analyzes the details of the detected abnormality (1205).

To be specific, when a packet is transmitted in the sequence-number-assigned access mode, after transmission of a packet including a command corresponding to a series of processes to be executed by a transmission destination, with the lapse of a predetermined length of time, the transmission source detects that some abnormality is occurred of mismatching of the sequence numbers. In the sequence-number-assigned confirmed access mode, after transmission of a packet subsequent to the packet with the abnormality of mismatching of sequence numbers, the transmission source detects that the abnormality of mismatching of sequence numbers has occurred to the transmission destination at the timing of receiving a response packet indicating the abnormality.

The transmission source then specifies which transmission destination is suffering from abnormality of mismatching of sequence numbers (1210). When the specified transmission destination is the IF section, the procedure goes to the process of step 1215, and when the specified transmission destination is the memory section 130, the procedure goes to the process of step 1230.

Described first is a case where the IF section is the transmission destination in which the abnormal event of mismatching of sequence numbers has occurred.

When the IF section is the transmission destination in which the abnormal event of mismatching of sequence numbers has occurred, because the abnormality of mismatching of sequence numbers has occurred with the communications in the sequence-number-assigned access mode, the transmission source executes a process corresponding to the abnormality of mismatching of sequence numbers in the sequence-number-assigned access mode. In this case, in FIG. 11, for example, applicable is the communications in the sequence-number-assigned access mode with a transmission source of the processor section 135, and with a transmission destination of the host IF section 115 or the disk IF section 120, i.e., the communications for starting storage of the write data into the memory section 130 via the host IF section 115 (1105, 1110, 1120, and 1125), and the communications for requesting the disk device 105 to store the data in the memory section 130 via the disk IF section 120 (1130 and 1140).

To be specific, the transmission source extracts, from the write data provided by the host computer 100, any part thereof not yet stored (1215).

Next, the transmission source forwards a command to the abnormality-occurred IF section to reset the sequence number of its own management (1220).

The transmission source then sends, to the abnormality-occurred IF section, a retry request to start writing of the write data not stored in the process of step 1215 (1225). This is the end of the sequence number mismatching process.

On the other hand, when the memory section is the transmission destination specified by the process of step 1210, it means that some abnormal event of mismatching of sequence numbers has occurred in the communications in the sequence-number-assigned confirmed access mode. The transmission source thus executes a process corresponding to the abnormality of mismatching of sequence numbers in the sequence-number-assigned confirmed access mode. In this case, applicable is the communications in the sequence-number-assigned confirmed access mode with a transmission source being the processor section 135, and a transmission destination being the memory section 130.

First of all, the transmission source extracts data (Input/Output) not yet stored in the memory section 130 (1230).

The transmission source then puts the data extracted in the process of step 1230 back to the state before data writing (1235).

Next, the transmission source sends a command to the abnormality-occurred memory section 130 for resetting the sequence number of its own management (1240). In response to the reset command issued by the transmission source in step 1240, the memory section 130 resets the sequence number. The transmission source sends, to the abnormality-occurred memory section 130, a retry request for starting writing of the data not stored in the process of the step 1255 (1245).

In this case, the transmission source sends, to the transmission destination, a command packet including a request of resetting the sequence number under the management of the transmission destination (1250).

With the elapse of a predetermined time after the command packet is transmitted in the process of step 1250, the transmission source sends a confirmation packet to check whether the matching of sequence numbers is now observed or not (1255).

The transmission source then receives a response packet from the transmission destination (1260). The transmission source then determines whether or not the response packet provided by the transmission destination is indicating that the sequence number is correct (1265).

When the process of step 1265 determines that the response packet provided by the transmission destination is not indicating that the sequence number is correct, it means that the abnormality of mismatching of sequence numbers is not yet cleared, and thus the transmission source makes not available the memory section 130 being the transmission destination (1270). This is the end of the sequence number mismatching process.

On the other hand, when the process of step 1265 determines that the response packet provided by the transmission destination is indicating that the sequence number is correct, it means that the abnormality of mismatching of sequence numbers is now cleared, and this is the end of the sequence number mismatching process.

According to the first embodiment of the invention, in the storage system, the processor section 135 selects any appropriate communications mode from a plurality of those based on a transmission source and a transmission destination so that a guarantee can be offered with the improvements of the performance capabilities of the storage system.

Second Embodiment

Figure 13:
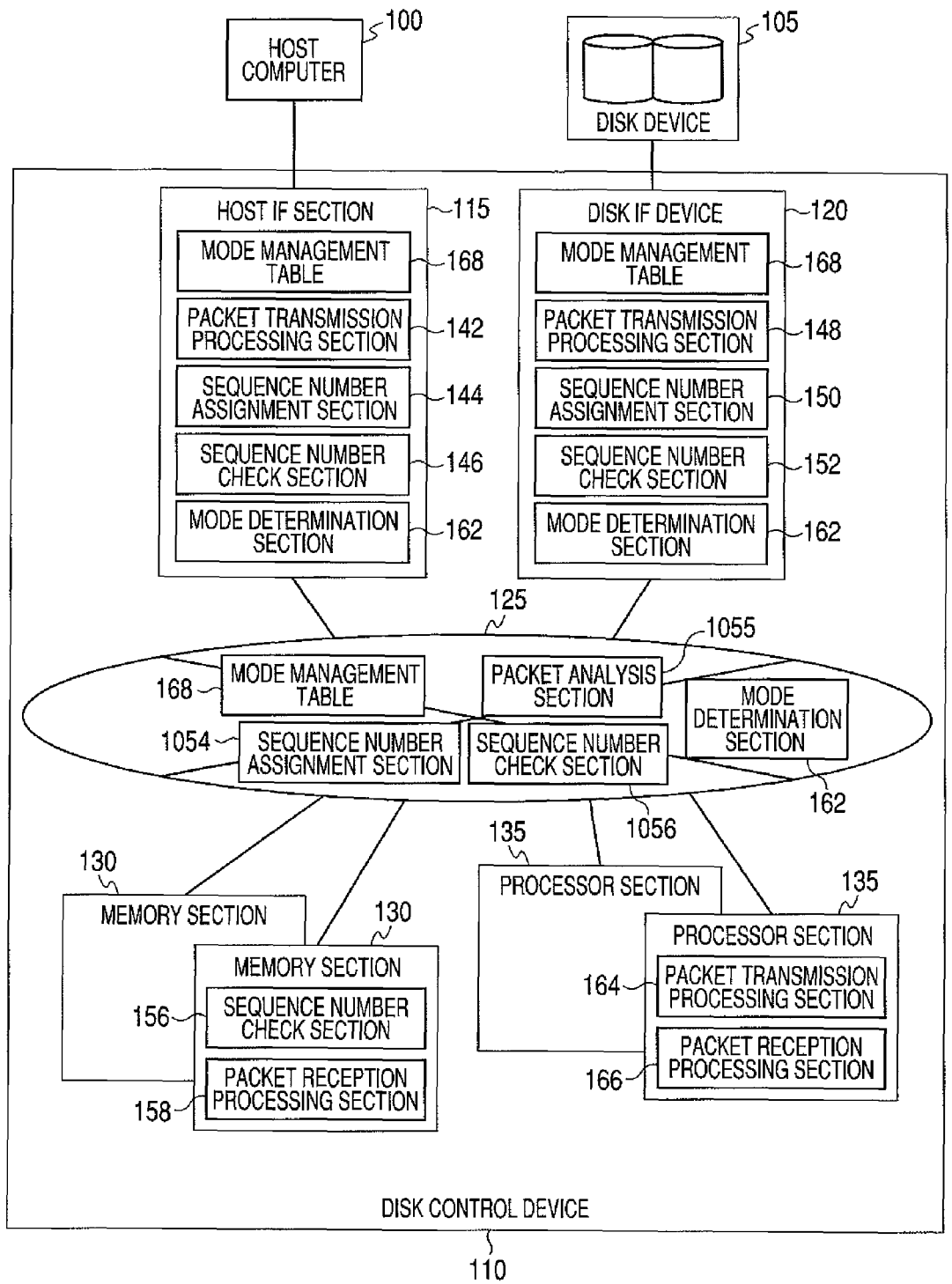
FIG. 13 is a block diagram showing the configuration of a storage system in a second embodiment of the invention.
Figure 14:
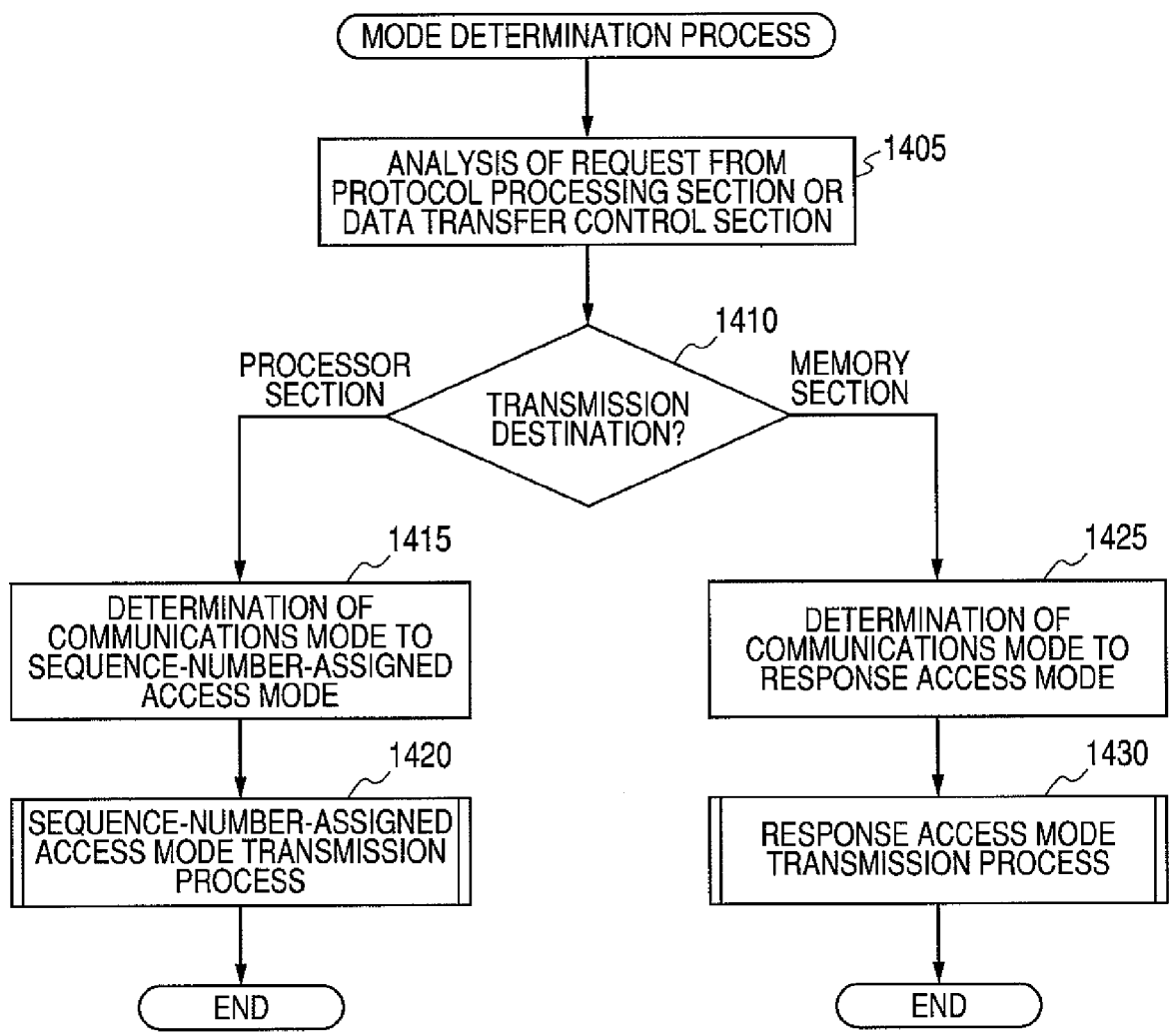
FIG. 14 is a flowchart of a mode determination process to be executed by a host IF section and a disk IF section in the second embodiment of the invention.
Figure 15:
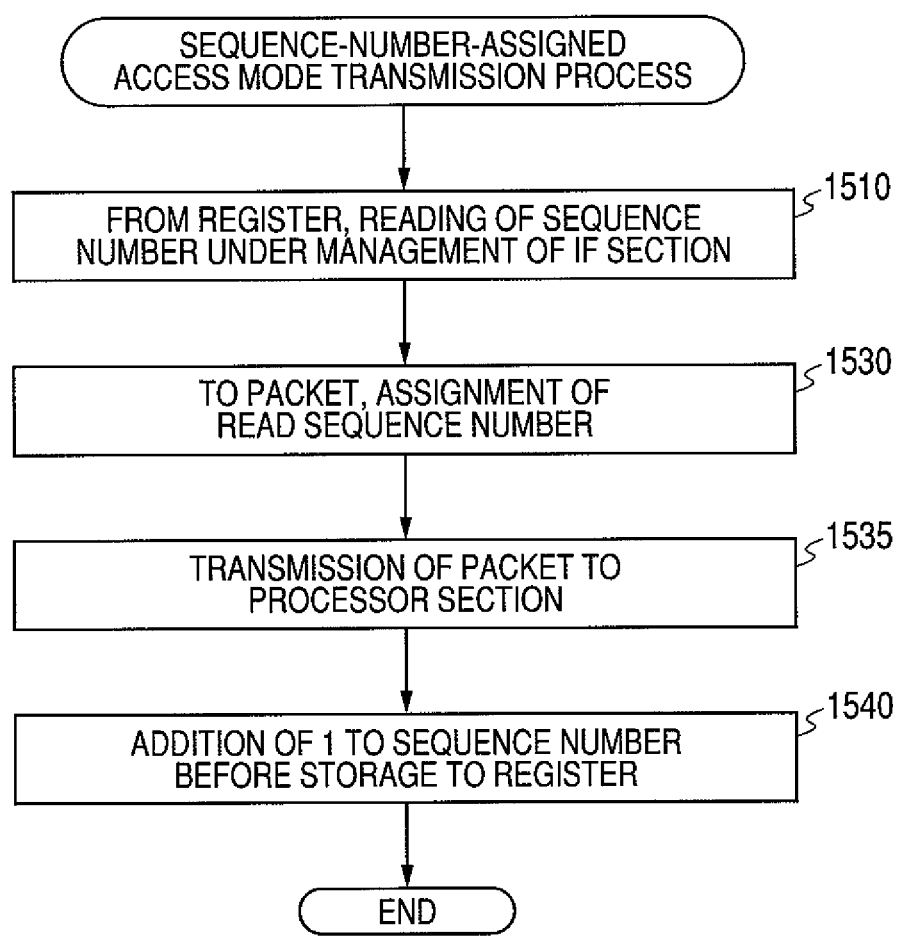
FIG. 15 is a flowchart of a sequence-number-assigned access mode transmission process in the second embodiment of the invention.

A second embodiment of the invention is described by referring to FIGS. 13 to 15. Note here that any configuration component and process in the second embodiment same as those in the first embodiment are provided with the same reference numerals, and not described again.

In the first embodiment, for packet transmission by the components, the processor section 135 is in charge of determining the communications mode. On the other hand, in the second embodiment, the component sections each determine the communications mode before packet transmission.

FIG. 13 is a block diagram showing the configuration of a storage system of the second embodiment of the invention.

Similarly to the first embodiment, the storage system is configured to include the host computer 100, the disk control device 110 connected to the host computer 100, and the disk device 105 connected to the disk control device 110.

The host IF section 115 and the disk IF section 120 of the second embodiment execute a communications mode determination process, and thus each include the mode management table 168 and the mode determination section 162.

The processor section 135 does not execute the communications mode determination process, and thus is not provided with the mode management table 168 and the mode determination section 162. The communications mode determination process for a packet to be transmitted by the processor section 135 is executed by a switch section 125 configuring a network.

Accordingly, the switch section 125 is configured to include the mode management table 168, the mode determination section 162, a sequence number assignment section 1054, a packet analysis section 1055, and a sequence number check section 1056.

The packet analysis section 1055 analyzes the packet received by the switch section 125. The sequence number assignment section 1054 is of the same configuration as the sequence number assignment section 144 of the host IF section 115, and thus is not described twice. The sequence number check section 1056 is of the same configuration as the sequence number check section 146 of the host IF section 115, and thus is not described twice.

By referring to FIG. 14, described next is the mode determination process to be executed by the mode determination section 162 of the host IF section 115, and that of the disk IF section 120.

FIG. 14 is a flowchart of the mode determination process to be executed by the host IF section 115 and the disk IF section 120 in the second embodiment of the invention. In the below, the host IF section 115 and the disk IF section 120 are collectively referred to as IF section.

When the IF section serves as a transmission source, the processor section 135 or the memory section 130 can serve as a transmission destination. The processor section 135 may serve as a transmission destination when the processor section 135 is notified of some type of request, e.g., write request, coming from the host computer 100, or when the processor section 135 is notified by the memory section 130 that the writing to the disk device 105 is completed.

The memory section 130 may serve as a transmission destination when the data asked for writing by the host computer 100 is written into the memory section 130, or when the data asked for reading from the host computer 100 is read from the memory section 130.

Note here that the communications mode is determined by the IF section referring to the mode management table 168 provided therein.

First of all, the IF section analyses a request corresponding to the command in a packet provided thereto from a protocol processing section or a data transfer control section (both not shown) (1405).

Next, the IF section determines a transmission destination for the packet based on the request analyzed in the process of step 1405 (1410).

When the process of step 1410 determines that the processor section 135 is the transmission destination, the IF section determines the communications mode to the sequence-number-assigned access mode (1415), makes the packet transmission processing section 142 or 148 to execute the sequence-number-assigned access mode transmission process (1420), and ends the mode determination process. The sequence-number-assigned access mode transmission process will be described in detail later by referring to FIG. 15.

On the other hand, when the process of step 1410 determines that the memory section 130 is the transmission destination, the IF section determines the communications mode to the response access mode (1425), makes the packet transmission processing section 142 or 148 to execute the response access mode transmission process (1430), and ends the mode determination process.

In the response access mode transmission process, the packet transmission processing section 142 or 148 adds the packet with data indicating that the communications mode is now the response access mode, and sends the packet to the memory section 130.

Note here that, in the response access mode transmission process, when receiving a response packet from the memory section 130 after sending the packet, the IF section notifies the processor section 135 that the process is now completed. The IF section may process any other request with respect to the memory section 130 until receiving the response packet from the memory section 130.

By referring to FIG. 15, described next is the sequence-number-assigned access mode transmission process. FIG. 15 is a flowchart of the sequence-number-assigned access mode transmission process of the second embodiment of the invention.

First of all, the IF section reads any of the sequence numbers of its own management (1510).

The IF section then adds, to a packet for transmission, the sequence number read in the process of step 1510 (1530).

The IF section then sends the packet to the processor section 135 being a transmission destination (1535). The IF section then increments the sequence number of its own management, stores thus incremented sequence number in the register thereof (1540), and ends the sequence-number-assigned access mode transmission process.

The processor section 135 of the second embodiment is not provided with the sequence number assignment section 166 and the sequence number check section 170. The assignment and checking of the sequence numbers taken charge by the processor section 135 in the first embodiment are executed by the component sections in the switch section 125 configuring the network, i.e., a sequence number assignment section 1054 and a sequence number check section 1056.

The switch section 125 determines the communications mode based on the contents of a packet analyzed by a packet analysis section 1055, and also based on the transmission destination of the packet. The packet herein is the one coming from the processor section 135. That is, as an alternative to the processor section 135, the switch section 125 executes the communications mode determination process. This communications mode determination process is the same as that of FIG. 7, and thus is not described again.

According to the second embodiment of the invention, in the storage system, each component of the disk control device determines any appropriate communications mode from a plurality of those based on the transmission source and destination. Accordingly, the storage system can offer a guarantee of reliability with the increase of the processing capabilities thereof. Moreover, the communications mode determination process is executed by any of the component sections whichever serving as a transmission source, whereby the load of process of the processor section 135 can be shared by other component sections.

While the invention has been described in detail, the foregoing description is in all aspects illustrative and not restrictive. It is understood that numerous other modifications and variations can be devised as below.

1. The functions implemented by the programs in the embodiments described above may be partially implemented by hardware, or the functions implemented by the hardware therein may be partially implemented by software. The storage system is not restricted to configurations of FIGS. 1 and 13 as long as the configuration allows storage or provision of data requested by a host computer.

2. In the embodiments described above, exemplified is the case where the component sections of the disk control device 110 are connected together over the network configured by the switch section 125. This is surely not restrictive, and the component sections may be connected by a bus as long as data communications is possible thereamong.

3. In the embodiments described above, the control section including an interface between the host computer 100 and the disk device 105 is provided as two components, i.e., the host IF section 115 and the disk IF section 120. This is surely not restrictive, and the disk control device 110 may include both interfaces, e.g., serve as the control section including the functions of the host IF section 115 and those of the disk IF section 120.

4. In the embodiments described above, exemplified is the case where the memory section 130 includes a memory area (not shown) being a cache memory, and a shared memory (not shown) for storage of control data and others. The location thereof is not surely restrictive as long as it is in the disk control device 110, e.g., in the memory provided in the host IF section 115.

5. In the embodiments described above, any various communications modes may be set as appropriate in accordance with the reliability and processing capabilities in need. With an emphasis on the performance irrespective of the limitation of application range, it is technically possible to perform every communication in the no-response access mode. In this invention, the principal objective is to select any appropriate communications mode from a plurality of those to achieve a high level for both the reliability and the performance capabilities.

What is claimed is:

1. A storage system, comprising:
a host computer; and
a disk control device connected to the host computer for communications therewith, and configured to perform control over a disk device that stores therein data requested for writing from the host computer, wherein
the disk control device includes:
a host interface section connected to the host computer;
a disk interface section connected to the disk device;
a memory section that includes a memory area for temporary storage of data for communications with the host computer, and a memory section including an area for storage of control data of the storage system; and
a processor section that includes a processor in charge of computing processing, and an area for storage of a program to be run by the processor, and
in the storage system, for data transmission from the host interface section or the disk interface section to the memory section, when the data requested by a transmission source for storage is stored in a transmission destination, the transmission destination is put in a sequence-number-assigned access mode,
wherein:
when the transmission destination determines that a source-side serial number included in a received packet is the same as a current destination-side serial number in the transmission destination, the transmission destination processes a content of the received packet in accordance with a command included in the received packet;
when the transmission destination determines that the source-side serial number is not the same as the current destination-side serial number, the transmission destination does not process a content of the received packet; and
when the transmission destination determines that the source-side serial number is not the same as the current destination-side serial number, the transmission destination forwards an error response back to the transmission source, and subsequently receives a reset command from the transmission source to synchronize the source-side serial number with the destination-side serial number, and then if the source-side serial number included in received confirmation packet is not the same as the current destination-side serial number in the transmission destination, the transmission destination returns an abnormal response packet to the transmission source.

2. The storage system according to claim 1, wherein after the reset command, if the source-side serial number included in a received confirmation packet is the same as the current destination-side serial number in the transmission destination, the transmission destination returns a normal response packet back to the transmission source.

3. The storage system according to claim 1, wherein
for transmission of a command about a setting to enable operation of the host interface section, the disk interface section, and the memory section, when the processor section performs communications with the host interface section, the disk interface section, and the memory section, the transmission destination is put in a mode for communications of not returning the response back to the transmission source, even if the transmission destination stores the data from the transmission source.

4. The storage system according to claim 1, wherein
the processor section
determines the sequence-number-assigned access mode, for a communications mode from the host interface section or the disk interface section, to the memory section, and
notifies the sequence-number-assigned access mode to the host interface section or the disk interface section.

5. The storage system according to claim 1, wherein
the host interface section or the disk interface section determines the sequence-number-assigned access mode, for a communications mode from the host interface section or the disk interface section, to the memory section.

6. The storage system according to claim 1, further comprising:
a network including a switch establishes a connection among the host interface section, the disk interface section, the memory section, and the processor section, and
the switch determines a mode for communications from the processor section to the memory area of the memory section.

7. A storage method implemented within a storage system, including:
a host computer; and
a disk control device connected to the host computer for communications therewith, and configured to perform control over a disk device that stores therein data requested for writing from the host computer, wherein
the disk control device includes:
a host interface section connected to the host computer;
a disk interface section connected to the disk device;
a memory section that includes a memory area for temporary storage of data for communications with the host computer, and a memory section including an area for storage of control data of the storage system; and
a processor section that includes a processor in charge of computing processing, and an area for storage of a program to be run by the processor, the storage method comprising:
in the storage system, for data transmission from the host interface section or the disk interface section to the memory section, when the data requested by a transmission source for storage is stored in a transmission destination, the transmission destination is put in a sequence-number-assigned access mode,
wherein:
when the transmission destination determines that a source-side serial number included in a received packet is the same as a current destination-side serial number in the transmission destination, the transmission destination processes a content of the received packet in accordance with a command included in the received packet;
when the transmission destination determines that the source-side serial number is not the same as the current destination-side serial number, the transmission destination does not process a content of the received packet; and
when the transmission destination determines that the source-side serial number is not the same as the current destination-side serial number, the transmission destination forwards an error response back to the transmission source and subsequently receives a reset command from the transmission source to synchronize the source-side serial number with the destination-side serial number, and then if the source-side serial number included in a received confirmation packet is not the same as the current destination-side serial number in the transmission destination, the transmission destination returns an abnormal response packet to the transmission source.

8. The storage method according to claim 7, wherein after the reset command, if the source-side serial number included in a received confirmation packet is the same as the current destination-side serial number in the transmission destination, the transmission destination returns a normal response packet back to the transmission source.

9. The storage method according to claim 7, wherein for transmission of a command about a setting to enable operation of the host interface section, the disk interface section, and the memory section, when the processor section performs communications with the host interface section, the disk interface section, and the memory section, the transmission destination is put in a mode for communications of not returning the response back to the transmission source, even if the transmission destination stores the data from the transmission source.

10. The storage method according to claim 7, wherein the processor section determines the sequence-number-assigned access mode, for a communications mode from the host interface section or the disk interface section, to the memory section, and notifies the sequence-number-assigned access mode to the host interface section or the disk interface section.

11. The storage method according to claim 7, wherein the host interface section or the disk interface section determines the sequence-number-assigned access mode, for a communications mode from the host interface section or the disk interface section, to the memory section.

12. The storage method according to claim 7, further comprising:

a network including a switch establishes a connection among the host interface section, the disk interface section, the memory section, and the processor section, and the switch determines a mode for communications from the processor section to the memory area of the memory section.

\* \* \* \* \*